(12) United States Patent
Wood et al.

(10) Patent No.: US 11,177,941 B2
(45) Date of Patent: Nov. 16, 2021

(54) METHODS AND SYSTEMS FOR A HETEROGENEOUS MULTI-CHAIN FRAMEWORK

(71) Applicant: Parity Technologies Ltd., London (GB)

(72) Inventors: Gavin Wood, Berlin (DE); Robert Habermeier, Berlin (DE)

(73) Assignee: Parity Technologies Ltd., London (GB)

( * ) Notice: Subject to any disclaimer, the term of this patent is extended or adjusted under 35 U.S.C. 154(b) by 0 days.

(21) Appl. No.: 16/867,691

(22) Filed: May 6, 2020

(65) Prior Publication Data

US 2020/0274694 A1 Aug. 27, 2020

Related U.S. Application Data

(62) Division of application No. 16/054,579, filed on Aug. 3, 2018.

(Continued)

(51) Int. Cl.
*G06F 16/27* (2019.01)
*H04L 9/06* (2006.01)
(Continued)

(52) U.S. Cl.
CPC ........ *H04L 9/0637* (2013.01); *G06F 16/2308* (2019.01); *G06F 16/2379* (2019.01);
(Continued)

(58) Field of Classification Search
CPC ... H04L 9/0637; H04L 9/3218; H04L 9/3239; H04L 2209/38; G06F 16/27;
(Continued)

(56) References Cited

U.S. PATENT DOCUMENTS

| | | | |
|---|---|---|---|
| 7,467,265 B1 * | 12/2008 | Tawri | G06F 12/0813 711/161 |
| 10,554,649 B1 * | 2/2020 | Fields | H04L 9/3263 |

(Continued)

OTHER PUBLICATIONS

Buchman et al., "The latest gossip on BFT consensus." arXiv preprint arXiv: 1807.04938 (2018). 14 pages.

(Continued)

*Primary Examiner* — Vaishali Shah
(74) *Attorney, Agent, or Firm* — Smith Baluch LLP

(57) ABSTRACT

Present-day blockchain architectures suffer from several problems, including poor extensibility and scalability. This may stem from tying two parts of the consensus architecture, namely canonicality and validity, too closely together. The Polkadot architecture, which is a heterogeneous multi-chain, provides better extensibility and scalability by setting canonicality and validity apart. Compartmentalizing canonicality and validity and keeping overall functionality to a minimum of security and transport introduces practical core extensibility in situ. Scalability is addressed through a divide-and-conquer approach to canonicality and validity, scaling out of its bonded core through the incentivization of untrusted public nodes. The heterogeneity of this architecture enables many highly divergent types of consensus systems interoperating in a trustless, fully decentralized "federation," allowing open and closed networks to have trust-free access to each other. This architecture is compatible with pre-existing networks, including Ethereum, and a useful component in a practical system for global-commerce scalability and privacy.

17 Claims, 4 Drawing Sheets

Related U.S. Application Data

(60) Provisional application No. 62/540,932, filed on Aug. 3, 2017.

(51) Int. Cl.
*H04L 9/32* (2006.01)
*G06F 21/60* (2013.01)
*G06F 16/23* (2019.01)
*G06F 21/64* (2013.01)

(52) U.S. Cl.
CPC .............. *G06F 16/27* (2019.01); *G06F 21/60* (2013.01); *G06F 21/602* (2013.01); *G06F 21/64* (2013.01); *H04L 9/3218* (2013.01); *H04L 9/3239* (2013.01); *H04L 2209/38* (2013.01)

(58) Field of Classification Search
CPC .... G06F 16/2379; G06F 21/602; G06F 21/64; G06F 16/2308
See application file for complete search history.

(56) References Cited

U.S. PATENT DOCUMENTS

| | | | |
|---|---|---|---|
| 2016/0028552 A1 | 1/2016 | Spanos et al. | |
| 2016/0330034 A1* | 11/2016 | Back | H04L 9/3255 |
| 2017/0118042 A1* | 4/2017 | Bhattacharya | H04L 12/4625 |
| 2017/0359374 A1* | 12/2017 | Smith | G06F 21/6245 |
| 2018/0113752 A1* | 4/2018 | Derbakova | G06Q 40/025 |
| 2018/0288127 A1 | 10/2018 | Zaidi et al. | |
| 2018/0341930 A1* | 11/2018 | Moir | G06F 16/27 |
| 2019/0058581 A1 | 2/2019 | Wood et al. | |
| 2019/0197534 A1* | 6/2019 | Alastair | G06Q 20/38215 |

OTHER PUBLICATIONS

Kohlhaas, An Introduction to Polkadot and Parachains. Feb. 7, 2017. Accessed at https://keepingstock.net/a-dummies-guide-to-polkadot-and-parachains-93708bd90775 on Jan. 3, 2019. 7 pages.
Polkadot Version 1, Sep. 20, 2017. 20 pages.
Polkadot, What is it? Accessed at https://polkadot.network/#cover on Jan. 2, 2019. 15 pages.
Tual, Web 3.0 Revisited—Part Three: "Polkadot: How it could integrate with 4 blockchain networks—and what's in it for us as developers". Jul. 23, 2017. Accessed at https://blog.stephantual.com/title-12deb5d6eeed on Jan. 3, 2019. 12 pages.
Wood, "Ethereum: A secure decentralised generalised transaction ledger." Ethereum project yellow paper 151 (Mar. 14, 2014): 1-32.
Wood, "Polkadot: Vision for a heterogeneous multi-chain framework Draft 1" White Paper (Nov. 14, 2016). 21 pages.
Wood, Chain Fibers Redux (2015) accessed at https://github.com/ethereum/wiki/wiki/Chain-Fibers-Redux on Jan. 2, 2019. Last edited by James Ray on Aug. 22, 2018. 8 pages.
Back et al., "Enabling Blockchain Innovations with Pegged Sidechains," Oct. 22, 2014, 25 pages (retrieved from https://blockstream.com/sidechains.pdf on Sep. 24, 2020).
Snow et al., "Factom: Business Processes Secured by Immutable Audit Trails on the Blockchain," Version 1.2, Apr. 25, 2018, 38 pages (retrieved from https://4454jm4bovib1sa6vrtflbew-wpengine.netdna-ssl.com/assets/docs/Factom_Whitepaper_v1.2.pdf on Sep. 24, 2020).
Zamfir, "Introducing Casper 'the Friendly Ghost,'" Aug. 1, 2015, 7 pages (retrieved from https://blog.ethereum.org/2015/08/01/introducing-casper-friendly-ghost/ on Sep. 24, 2020).
David et al., "Ouroboros Praos: An adaptively-secure, semi-synchronous proof-of-stake blockchain," Nov. 14, 2017, 37 pages.

\* cited by examiner

METHODS AND SYSTEMS FOR A HETEROGENEOUS MULTI-CHAIN FRAMEWORK

CROSS-REFERENCE TO RELATED APPLICATION(S)

This application is a divisional application of U.S. application Ser. No. 16/054,579, entitled "Methods and Systems for a Heterogeneous Multi-Chain Framework," which was filed on Aug. 3, 2018.

U.S. application Ser. No. 16/054,579 claims the priority benefit, under 35 U.S.C. § 119(e), of U.S. Application No. 62/540,932, entitled "METHODS AND SYSTEMS FOR A heterogeneous MULTI-CHAIN FRAMEWORK," which was filed on Aug. 3, 2017.

Each of these Applications are incorporated herein by reference in its entirety.

BACKGROUND

Blockchains have demonstrated great promise in several fields, including Internet of Things (IoT), finance, governance, identity management, web-decentralization and asset-tracking. Diverse blockchains often serve specific and unique purposes. However, these blockchain networks exist in isolation with no communication or interoperability between them.

SUMMARY

Methods and systems for a heterogeneous multi-chain framework are disclosed herein. In one implementation a method comprises receiving a header and a state-transition proof associated with a candidate block at a validator node in a relay chain from a collator node in a parachain. The parachain can be one of a plurality of heterogeneous parachains. The method also comprises validating the header and the state-transition proof at the validator node. The method also comprises rebroadcasting the candidate block to at least one other validator node, if any, in the relay chain in response to validation of the header and the state-transition proof. The method also comprises broadcasting a statement about validity and availability of the candidate block or other received candidate blocks to the at least one other validator node in the relay chain. The method also comprises a consensus process, wherein the at least one validator node will input their candidate block, if any, and produce a relay chain block containing some potentially-empty set of candidate blocks, which is not guaranteed to include the candidate block, but will in the general case contain either the candidate block or some other valid candidate block in its place. The method also comprises, in the case that any invalid candidate blocks are included, due to the activity of malicious or byzantine nodes, a process for detection and reversion of the invalid candidate block and the punishment of the offending nodes.

A decentralized computer network to enable shared security for a heterogeneous plurality of blockchains, interoperability between the heterogeneous plurality of blockchains, and scalability of the heterogeneous plurality of blockchains is also disclosed herein. The decentralized computer network comprises a plurality of nodes. Each node in the plurality of nodes is communicably coupled via peer-to-peer technology to every other node in the plurality of nodes. Each node can have a unique identity and can be configured to perform at least one prescribed function. The plurality of nodes include at least one validator node to perform a first prescribed function. The first prescribed function can include instructions to: receive a corresponding candidate block from a corresponding collator node of an assigned parachain for the at least one validator node. The corresponding candidate block can be a block in the assigned parachain. The assigned parachain can be a part of a first blockchain in the heterogeneous plurality of blockchains. The first prescribed function can also include instructions to evaluate validity of the candidate block, and upon determining validity, include the candidate block into a relay-chain. The relay-chain is a blockchain managed by the decentralized computer network. Upon determining that the at least one validator node has not performed the first prescribed function, the decentralized computer network can be configured to punish the at least one validator node to enable shared security for a heterogeneous plurality of blockchains. Inclusion of the candidate block into the relay-chain enables interoperability between the heterogeneous plurality of blockchains and enables scalability of the heterogeneous plurality of blockchains.

All combinations of the foregoing concepts and additional concepts discussed in greater detail below (provided such concepts are not mutually inconsistent) are part of the inventive subject matter disclosed herein. All combinations of claimed subject matter appearing at the end of this disclosure are part of the inventive subject matter disclosed herein. The terminology used herein that also may appear in any disclosure incorporated by reference should be accorded a meaning most consistent with the concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Figure 1:
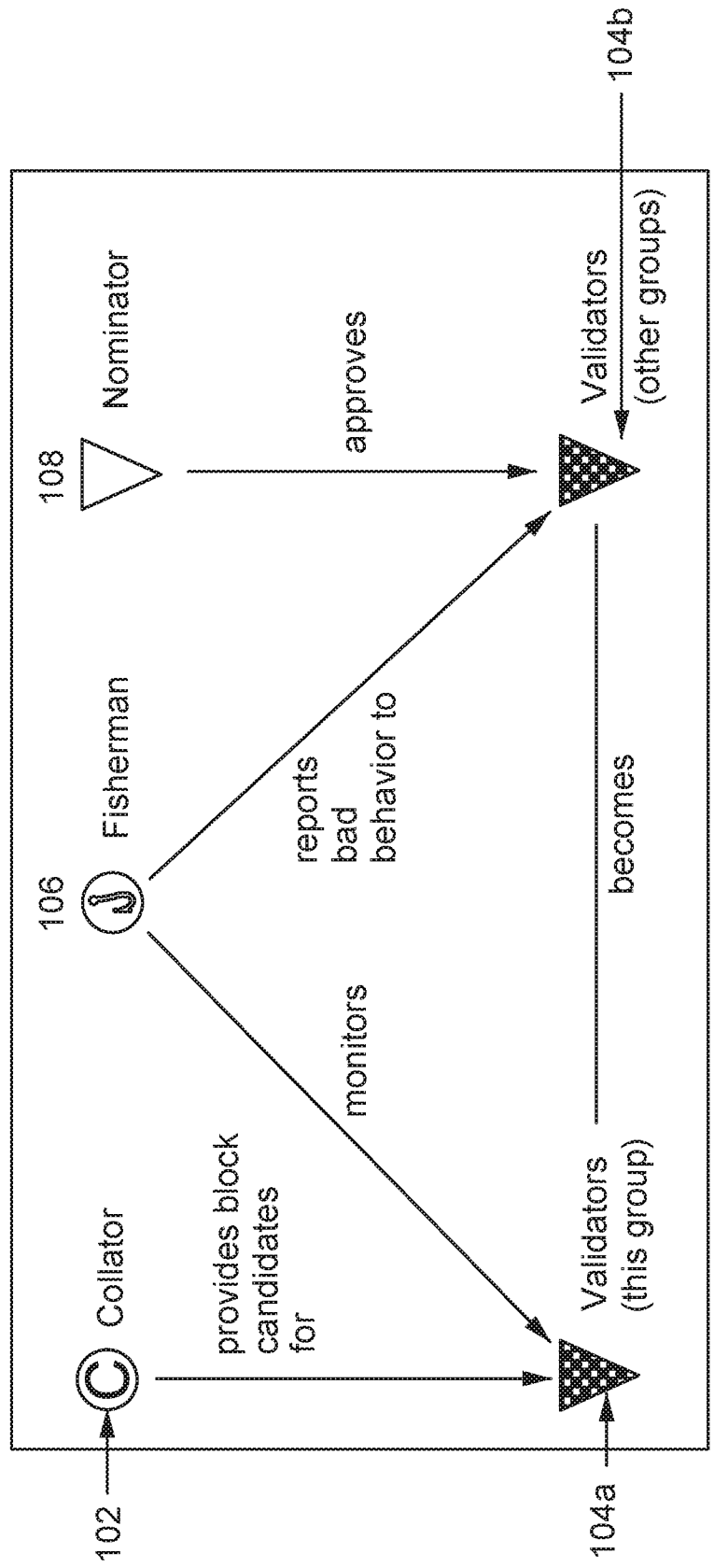
FIG. 1 illustrates interaction between four basic roles in an example implementation of the Polkadot network.

The present disclosure describes concepts related to, and implementations of, methods and systems for a heterogeneous multi-chain network.

Introduction

As used in the specification and in the claims, the phrase "blockchain" means a distributed database in the form of a continuously growing list of records, called blocks. A blockchain is typically managed by a peer-to-peer computer network, with the peers collectively adhering to a protocol for creating and validating new blocks. Once recorded to a blockchain, the data in any given block cannot be altered retroactively without the alteration of all subsequent blocks and the collusion of a majority of the peers on the network.

Some non-limiting examples of blockchains include public permissionless blockchains, such as the Bitcoin network or the public e Ethereum network, and private blockchains, such as Hyperledger Fabric.

As used in the specification and in the claims, the phrase "node" refers to software and/or hardware that is assigned with a unique identity and is configured to perform at least one prescribed function. However, there may be instances when the node either intentionally or unintentionally may not perform the prescribed function. Put differently, although the node is configured to perform a prescribed function, it may not always perform its prescribed function. In some such instances, a node may be considered a "malicious" node if it has proven, repeated behavior of not performing its prescribed function. For example, a node can be an installation of software on an internet-connected computer. The software may be stored in a non-volatile memory and executed by the computer's processor to perform the prescribed function (a).

As used herein in the specification and in the claims, the phrase "Polkadot" refers to a scalable heterogeneous multi-chain framework as described in the paragraphs below, including both the relay chain (described below) and the protocol for alteration of and advancement for the chains in the multi-chain set. Polkadot is designed to enable: shared security for multiple heterogeneous blockchains, interoperability between the heterogeneous blockchains, and scalability of the heterogeneous blockchains. The "Polkadot network" is the realisation of Polkadot.

As used herein in the specification and in the claims, the term "relay-chain" refers to the foundation chain of Polkadot. A relay-chain is configured to provide security advancement, and communication channels for its attached constituent heterogeneous "parachains." (A parachain is a parallelized chain or data-structure that is hosted on the relay-chain.) In some implementations, the relay-chain may host, side-by-side, many globally-coherent dynamic data-structures that can be validated.

Interoperability, Scalability, and Pooled Security Among Heterogeneous Blockchains Polkadot enables blockchains to communicate and pool their security while still allowing them to have entirely arbitrary state-transition functions. This opens the door to a network of blockchains, where private and consortium chains can be integrated with open and public chains (e.g., Ethereum) and communicate with the open and public chains while revealing only the data they choose.

INTEROPERABILITY—Presently, diverse blockchain networks serving specific and unique purposes exist in isolation with no communication or interoperability between them. This is an existential problem that needs to be addressed for a truly trustless ecosystem to develop and thrive. Polkadot can enable applications and smart contracts on one blockchain to seamlessly transact with data and assets on other blockchains.

SCALABILITY—On a conventional blockchain network, execution of transactions is intrinsically tied to the consensus process, creating a bottleneck as more transactions try to make their way through the network. This drastically limits the scalability of conventional blockchain networks. Polkadot separates consensus from execution by providing agreement over summaries of accumulated execution from several parallelized chains or parachains. Since different segments of the network can work on each parachain, a trade-off can be made between increased execution but longer latency to detection of incorrect execution. Polkadot includes a detection process for incorrect transaction execution and punishment of offenders (see section on fishermen below). This technology can be applied recursively, leading to vast improvements in scalability, where security must be propagated to all recursive instantiations.

SHARED SECURITY—Free-standing blockchains have isolated security since they compete for security resources. Polkadot provides pooled security for all chains within the Polkadot network, implying that the individual chains can leverage collective security without having to start from scratch to gain traction and trust.

Existing Technologies

A more complex scalable solution known as Chain fibers, dating back to June 2014 and first published later that year (see https://github.com/ethereum/wiki/wiki/Chain-Fibers-Redux), made the case for a single relay-chain and multiple homogeneous chains providing a transparent interchain execution mechanism. Decoherence was paid for through transaction latency-transactions requiring the coordination of disparate portions of the system would take longer to process.

While there are no systems comparable to Polkadot currently in production, several systems of some relevance have been proposed, though few in any substantial level of detail. These proposals can be broken down into systems which drop or reduce the notion of a globally coherent state machine, those which attempt to provide a globally coherent singleton machine through homogeneous shards and those which target only heterogeneity.

Systems without Global States

Factom is a system that demonstrates canonicality without the according validity, effectively allowing the chronicling of data. Because of the avoidance of global state and the difficulties with scaling which this brings, it can be considered a scalable solution. However, as mentioned previously, the set of problems it solves is strictly and substantially smaller.

Tangle is a novel approach to consensus systems. Rather than arranging transactions into blocks and forming consensus over a strictly linked list to give a globally canonical ordering of state-changes, it largely abandons the idea of a heavily structured ordering and instead pushes for a directed acyclic graph of dependent transactions with later items helping canonicalize earlier items through explicit referencing. For arbitrary state-changes, this dependency graph would quickly become intractable, however for the much simpler UTXO model this becomes quite reasonable. Because the system is only loosely coherent, and transactions are generally independent of each other, a large amount of global parallelism becomes quite natural. Using the UTXO model does have the effect of limiting Tangle to a purely value-transfer "currency" system rather than anything more general or extensible. Furthermore, without the hard global coherency, interaction with other systems—which tend to use an absolute degree knowledge over the system state—becomes impractical.

Heterogeneous Chain Systems

Side-chains is a proposed addition to the Bitcoin protocol which would allow trustless interaction between the main Bitcoin chain and additional side-chains. There is no provision for any degree of 'rich' interaction between side-chains: the interaction would be limited to allowing side-chains to be custodians of each other's assets, effecting—in the local jargon—a two-way peg. The end vision is for a framework where the Bitcoin currency could be provided with additional, if peripheral, functionality through pegging it onto some other chains with more exotic state transition systems than the Bitcoin protocol allows. In this sense, side-chains addresses extensibility rather than scalability.

Indeed, there is fundamentally no provision for the validity of side-chains; tokens from one chain (Bitcoin) held on behalf of a side-chain are secured only by the side-chain's ability to incentivize miners to canonicalize valid transitions. The security of the Bitcoin network cannot easily be transitioned to work on behalf of other blockchains. Furthermore, a protocol for ensuring Bitcoin miners merge-mine (that is duplicate their canonicalization power onto that of the side-chain) and, more importantly, validate the side-chain's transitions is outside the scope of this proposal.

Cosmos is a proposed multi-chain system in the same vein as side-chains, swapping the Nakamoto PoW consensus method for Jae Kwon's Tendermint process. Essentially, it describes multiple chains (operating in zones) each using individual instances of Tendermint, together with a means for trust-free communication via a master hub chain. This interchain communication is limited to the transfer of digital assets ("specifically about tokens") rather than arbitrary information, however such interchain communication does have a return path for data, e.g. to report to the sender on the status of the transfer.

Validator sets for the zoned chains, and the means of incentivizing them, are, like side-chains, left as an unsolved problem. The general assumption is that each zoned chain will itself hold a token of value whose inflation is used to pay for validators. Still in the early stages of design, at present the proposal lacks comprehensive details over the economic means of achieving the scalable certainty over global validity. However, the loose coherence required between the zones and the hub will allow for additional flexibility over the parameters of the zoned chains compared to that of a system enforcing stronger coherence.

Casper/Ethereum 2.0

No comprehensive review or side-by-side comparison between Casper and Polkadot has been made, though one can make a fairly sweeping (and accordingly inaccurate) characterization of the two. Casper is a reimagining of how a PoS consensus process could be based around participants betting on which fork would ultimately become canonical. Substantial consideration was given to ensuring that it be robust to network forks, even when prolonged, and have some additional degree of scalability on top of the basic Ethereum model. As such, Casper to date has tended to be a substantially more complex protocol than Polkadot and its forebears, and a substantial deviation from the basic blockchain format.

While Casper and Polkadot both represent interesting new protocols and, in some sense, augmentations of Ethereum, there are substantial differences between their ultimate goals and paths to deployment. Ethereum Sharding (to be deployed in Ethereum 2.0), is an Ethereum Foundation-centered project originally designed to be a PoS alteration to the protocol, making use of Casper as a consensus algorithm, with no desire to create a fundamentally scalable blockchain. Crucially, it is designed to be a hard-fork, rather than anything more expansive and thus all Ethereum clients and users would upgrade or remain on a fork of uncertain adoption. As such, deployment is made substantially more difficult as is inherent in a decentralized project where tight coordination is desired. It remains unseen as to how Casper or Ethereum 2.0 will iterate in the future and what it will look like should it finally be deployed.

Polkadot differs in several ways; first and foremost, Polkadot is designed to be a fully extensible and scalable blockchain development, deployment and interaction test bed. It is built to be a largely future-proof harness able to assimilate new blockchain technology as it becomes available without over-complicated decentralized coordination or hard forks. Polkadot can have several use cases such as encrypted consortium chains and high-frequency chains with very low block times that are unrealistic to do in any future version of Ethereum currently envisioned. Finally, the coupling between Polkadot and Ethereum is extremely loose; no action on the part of Ethereum is necessary to enable trustless transaction forwarding between the two networks.

In short, while Casper/Ethereum 2.0 and Polkadot share some fleeting similarities their end goals may be substantially different. Rather than competing, the two protocols can ultimately co-exist under a mutually beneficial relationship.

Polkadot

Polkadot is a scalable heterogeneous multi-chain framework, including both the relay-chain and the protocol for alteration of and advancement for the chains in the constituent heterogeneous multi-chain set. This means that unlike other blockchain implementations which have focused on providing a single chain of varying degrees of generality over potential applications, Polkadot itself is designed to provide no inherent application functionality at all. Rather, Polkadot provides the bedrock "relay-chain" upon which many validatable, globally-coherent dynamic data-structures may be hosted side-by-side. These data-structures are called "parallelized" chains or parachains, though there is no specific need for them to be blockchain in nature.

In other words, Polkadot may be observed as a set of independent chains (the set containing Ethereum, Ethereum Classic, Namecoin and Bitcoin) except for two very important points: Pooled security; trust-free interchain transactability. These points make Polkadot "scalable." In principle, a problem to be deployed on Polkadot may be substantially parallelized-scaled out-over many parachains. Since all aspects of each parachain may be conducted in parallel by a different segment of the Polkadot network, the system has some ability to scale. Polkadot provides a rather bare-bones piece of infrastructure leaving much of the complexity to be addressed at the middleware level. This is a conscious decision intended to reduce development risk, enabling the requisite software to be developed within a short time span and with a good level of confidence over its security and robustness.

Polkadot consists of many parachains with potentially differing characteristics which can make it easier to achieve anonymity or formal verification. Transactions can be spread out across the chains, allowing many more transactions to be processed in the same period. Polkadot ensures that each of these blockchains remain secure and that any dealings between them are faithfully executed. Specialized parachains called bridges can link the independent blockchains.

Modern, efficient blockchain implementations such as the Parity Ethereum client can process more than 3,000 transactions per second when running on performant consumer hardware. However, current real-world blockchain networks are practically limited to around 30 transactions per second. This limitation mainly originates from the fact that the current synchronous consensus mechanisms require wide timing margins of safety on the expected processing time, which is exacerbated by the desire to support slower implementations. This is due to the underlying consensus architecture: the state transition mechanism, or how parties collate and execute transactions, has its logic fundamentally tied into the consensus "canonicalization" mechanism, or the means by which parties agree upon one of a number of possible, valid, histories.

This applies equally to both proof-of-work (PoW) systems such as Bitcoin and Ethereum and proof-of-stake (PoS) systems such as NXT and Bitshares: all ultimately suffer from the same handicap. It is a simple strategy that helped make blockchains a success. However, by tightly coupling the consensus mechanism and the state transition mechanism into a single unit of the protocol, such systems bundle together multiple different actors and applications with different risk profiles, different scalability and privacy desires. One size does not fit all. Too often it is the case that in a desire for broad appeal, a network adopts a degree of conservatism which results in a lowest-common-denominator optimally serving few and ultimately leading to a failing in the ability to innovate, perform and adapt, sometimes dramatically so.

Some systems such as Factom drop the state-transition mechanism altogether. However, much of the utility that is desired involves the ability to transition state according to a shared state-machine. Dropping it solves an alternative problem; it does not provide an alternative solution. Therefore, Polkadot adopts a strategy of decoupling the consensus mechanism from the state-transition mechanism to achieve a scalable decentralized compute platform/scalable decentralized computer network.

Protocol, Implementation and Network

Reference to Polkadot includes reference to a network protocol and the (hitherto presupposed) primary public network that runs this protocol.

In one implementation of the Polkadot protocol, also known as the Parity Polkadot Platform (PPP), the implementation includes a full protocol implementation together with API bindings. Like other Parity blockchain implementations, PPP is designed to be a general-purpose blockchain technology stack, neither uniquely for a public network nor for private/consortium operation. The development of it thus far has been funded by several parties including through a grant from the British government.

Some sections of the disclosure describe Polkadot under the context of a public network. The functionality in a public network is a superset of that required in alternative (private and/or consortium) settings.

The Philosophy of Polkadot

Polkadot should provide an absolute rock-solid foundation on which to build the next wave of consensus systems, right through the risk spectrum from production-capable mature designs to nascent ideas. By providing strong guarantees over security, isolation and communication, Polkadot can allow parachains to select from a range of properties themselves. In the foreseeable future, several experimental blockchains may push the properties of what could be considered sensible today.

For instance, conservative, high-value chains like Bitcoin or Z-cash may co-exist alongside lower-value "theme-chains" and test-nets with zero or near-zero fees. Similarly, fully-encrypted, "dark", consortium chains may operate alongside—and even provide services to—highly functional and open chains such as those like Ethereum. Similarly, new VM-based chains such as a subjective time-charged Wasm chain may be used as a means of outsourcing difficult compute problems from a more mature Ethereum-like chain or a more restricted Bitcoin-like chain.

To manage chain upgrades, Polkadot can inherently support some sort of governance structure, likely based on existing stable political systems and having a bicameral aspect like the Yellow Paper Council. As the ultimate authority, the underlying stakable token holders would have "referendum" control. To reflect the users' desire for development but the developers' desire for legitimacy, one implementation would be to form the two chambers from a "user" committee (made up of bonded validators) and a "technical" committee made up of major client developers and ecosystem players. The body of token holders would maintain the ultimate legitimacy and form a supermajority to augment, reparametrize, replace or dissolve this structure Whereas reparameterization is typically trivial to arrange within a larger consensus mechanism, more qualitative changes such as replacement and augmentation may be either non-automated "soft-decrees" (e.g. through the canonicalization of a block number and the hash of a document formally specifying the new protocol) or involve the core consensus mechanism to contain a sufficiently rich language to describe any aspect of itself which may change. The former may be chosen to facilitate a reasonable development timeline.

Polkadot's primary tenets and the rules within which all design decisions are evaluated are: (1) Polkadot should have as little functionality as possible. (2) No additional complexity should be present in the base protocol than can reasonably be offloaded into middleware, placed through a parachain or introduced in a later optimization. (3) No unnecessary requirement, constraint or limitation should be placed on parachains; Polkadot should be a test bed for consensus system development which can be optimized through making the model into which extensions fit as abstract as possible. (4) Polkadot should provide a fundamentally stable base-layer. In addition to economic soundness, this also means decentralizing to minimize the vectors for high-reward attacks.

Participation in Polkadot

A Polkadot network can include multiple nodes. In some instances, at least some of these multiple nodes are assigned a role and/or a prescribed function. There are There are four basic roles in the upkeep of a Polkadot network. FIG. 1 illustrates interaction between four basic roles in an example implementation of the Polkadot network. In this implementation, some nodes Polkadot network are assigned roles as collators 102, fishermen 106, nominators 108 and validators 104 (for example, validator 104a for a first constituent blockchain and validator 104b for a second constituent blockchain). In one possible implementation of Polkadot, the validator role may be broken down into two roles: basic validator and availability guarantor; this is discussed below.

Validators 104

A validator 104 is the highest charge and helps seal new blocks on the Polkadot network. The validator's 104 role is contingent upon a sufficiently high bond being deposited, though the Polkadot network can allow other bonded parties to nominate one or more validators 104 to act for them and as such some portion of the validator's 104 bond may not necessarily be owned by the validator 104 itself but rather by these nominators 108.

A validator 104 runs a relay-chain client implementation with high availability and bandwidth. At each block the node is ready to accept the role of ratifying a new block on a nominated parachain. This process involves receiving, validating and republishing candidate blocks. The nomination is deterministic but virtually unpredictable much in advance. Since the validator 104 cannot reasonably be expected to maintain a fully-synchronized database of all parachains, it is expected that the validator 104 will nominate the task of devising a suggested new parachain block to a third-party, known as a collator 102.

Once all new parachain blocks have been properly ratified by their appointed validator 104 subgroups, validators 104 then ratifies the relay-chain block itself. This involves updating the state of the transaction queues (essentially moving data from a parachain's output queue to another parachain's input queue), processing the transactions of the ratified relay-chain transaction set and ratifying the final block, including the final parachain changes.

A validator 104 not fulfilling their duty to find consensus under the rules of the chosen consensus process is punished. For initial, unintentional failures, this is through withholding the validator's 104 reward. Repeated failures result in the reduction of their security bond (through burning). Provably malicious actions such as double-signing or conspiring to provide an invalid block result in the loss of the entire bond (which is partially burnt but mostly given to the informant and the honest actors).

In some sense, validators 104 are like the mining pools of current PoW blockchains.

Nominators 108

A nominator 108 is a stake-holding party who contributes to the security bond of a validator 104. They have no additional role except to place risk capital and as such to signal that they trust a particular validator 104 (or set thereof) to act responsibly in their maintenance of the network. They receive a pro-rata increase or reduction in their deposit according to the bond's growth to which they contribute.

Together with collators 102, next, nominators 108 are in some sense like the miners of the present-day PoW networks.

Collators 102

Transaction collators 102 (collators for short) are parties who assist validators 104 in producing valid parachain blocks. They maintain a "full-node" for a particular parachain; meaning that they retain all necessary information to be able to author new blocks and execute transactions in much the same way as miners do on current PoW blockchains. Under normal circumstances, they will collate and execute transactions to create an unsealed block, and provide it, together with a zero-knowledge proof, to one or more validators 104 presently responsible for proposing a parachain block.

The precise nature of the relationship between collators 102, nominators 108 and validators 104 will likely change over time. In one implementation collators 102 can work very closely with validators 104. One implementation can include Remote Procedure Calls (RPCs) to allow a parachain collator node 102 to unconditionally supply a (relay-chain) validator node 104 with a provably valid parachain block. As the cost of maintaining a synced version of all such parachains increases, additional infrastructure can be provided to help separate out the duties to independent, economically-motivated, parties.

In one implementation, collator 102 pools can vie to collect the most transaction fees. Such collators 102 may become contracted to serve particular validators 104 over a period for an on-going share in the reward proceeds. Alternatively, "freelance" collators 104 may simply create a market offering valid parachain blocks in return for a competitive share of the reward payable immediately. Similarly, decentralized nominator 108 pools would allow multiple bonded participants to coordinate and share the duty of a validator 104. This ability to pool ensures open participation leading to a more decentralized system.

Fishermen 106

Unlike the other two active parties (e.g., collator 102 and validator 104), fishermen 106 are not directly related to the block-authoring process. Rather they are independent "bounty hunters" motivated by a large one-off reward. Precisely due to the existence of fishermen 106, events of misbehavior are seldom expected to happen, and when they do only due to the bonded party being careless with secret key security, rather than through malicious intent. The name comes from the expected frequency of reward, the minimal requirements to take part and the eventual reward size.

Fishermen 106 get their reward through a timely proof that at least one bonded party acted illegally. Illegal actions include signing two blocks each with the same ratified parent or, in the case of parachains, helping ratify an invalid block. To prevent over-rewarding or the compromise and illicit use of a session's secret key, the base reward for providing a single validator's 104 illegally signed message is minimal. This reward increases asymptotically as more corroborating illegal signatures from other validators are provided implying a genuine attack. The asymptote is set at 66% following a base security assertion that at least two-thirds of the validators act benevolently.

Fishermen 106 are somewhat like "full nodes" in present-day blockchain systems that the resources used are relatively small and the commitment of stable uptime and bandwidth is not necessary. Fishermen differ in so much as they post a small bond. This bond prevents sybil attacks from wasting validators' time and compute resources. It is immediately withdrawable, probably no more than the equivalent of a few dollars and may lead to reaping a hefty reward from spotting a misbehaving validator.

Design Overview

This section is intended to give a brief overview of the system. A more thorough exploration of the system is given in the section following it.

Figure 2:
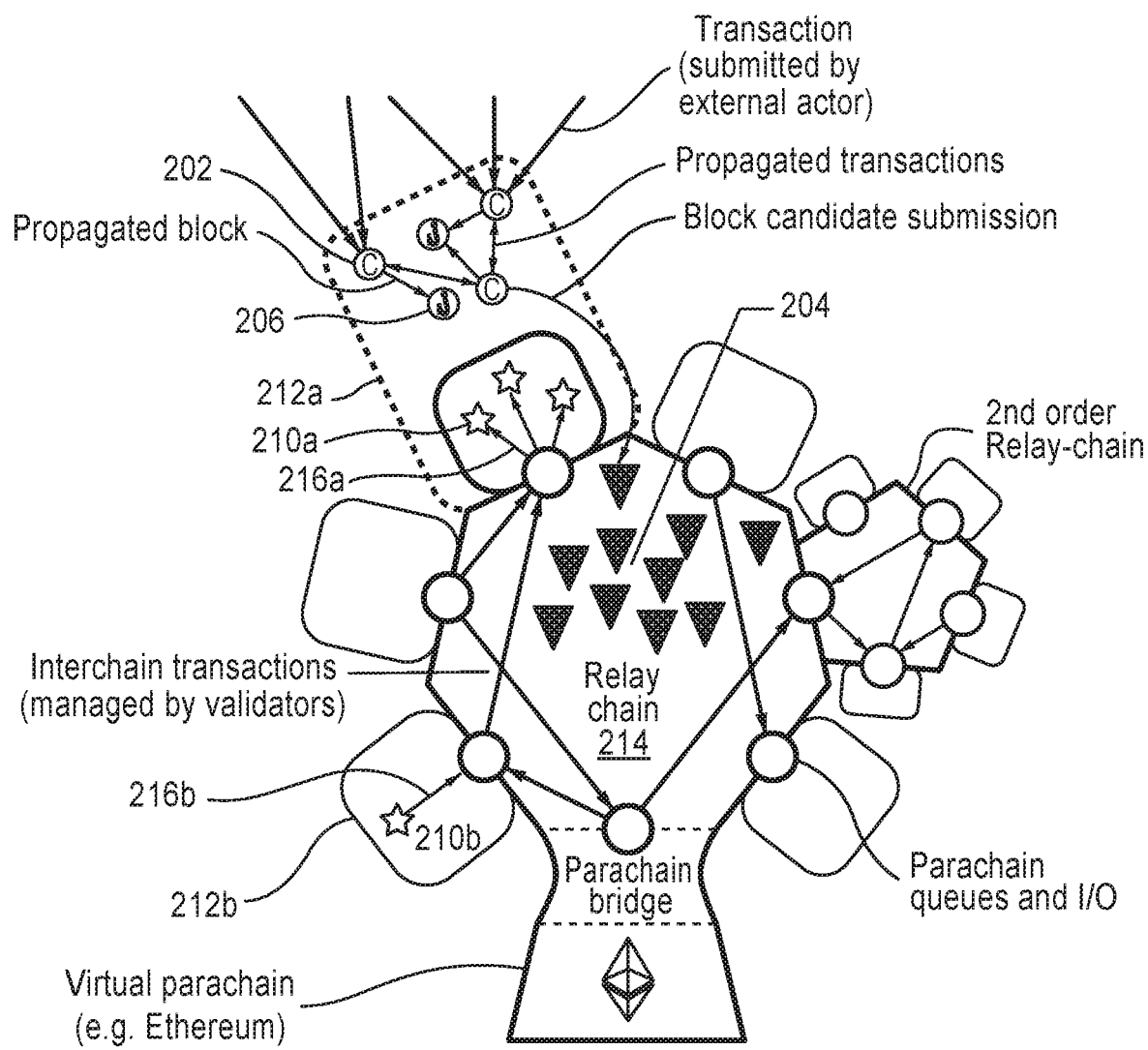
FIG. 2 illustrates a summary schematic of the Polkadot system.

FIG. 2 illustrates a summary schematic of the Polkadot system. This shows collators 202 collecting and propagating user-transactions, as well as propagating block candidates to fishermen 206 and validators 204. It also shows how an account 210b can post a transaction 216b which is carried out of its parachain 212b, via the relay-chain 214 and on into another parachain 212a where it can be interpreted as a transaction 216a to an account 210a there.

Consensus

On the relay-chain 214, Polkadot achieves low-level consensus over a set of mutually agreed valid blocks through a modern asynchronous Byzantine fault-tolerant (BFT) process. The process may be inspired by the simple Tendermint and the substantially more involved HoneyBadgerBFT. The latter provides an efficient and fault-tolerant consensus over an arbitrarily defective network infrastructure, given a set of mostly benign authorities or validators.

For a proof-of-authority (PoA) style network, this alone would be enough, however Polkadot can be deployable as a network in a fully open and public situation without any particular organization or trusted authority required to maintain it. As such a set of validators should be determined and should be incentivized to be honest. For this a PoS based selection criteria can be used.

Proving the Stake

It is assumed that the network will have some means of measuring how much "stake" any account has. For ease of comparison to pre-existing systems, this unit of measurement can be called "tokens". Unfortunately, the term is less than ideal for several reasons, not least that being simply a scalar value associated with an account, there is no notion of individuality.

In one implementation, validators 204 can be elected, infrequently (at most once per day but perhaps as seldom as once per quarter), through a Nominated Proof-of-Stake (NPoS) scheme. Incentivization can happen through a pro-rata allocation of funds coming from a token base expansion (up to 100% per year, though more likely around 10%) together with any transaction fees collected. While monetary base expansion typically leads to inflation, since all token owners would have a fair opportunity at participation, no token-holder would need to suffer a reduction in value of their holdings over time provided they were happy to take a role in the consensus mechanism. A proportion of tokens would be targeted for the staking process; the effective token base expansion would be adjusted through a market-based mechanism to reach this target.

Validators 204 are bonded heavily by their stakes; exiting validators' 204 bonds remain in place long after the validators' 204 duties cease (perhaps around 3 months). This long bond-liquidation period allows past or future misbehavior to be detected and punished up until the periodic checkpointing of the chain. Misbehavior results in punishment, such as reduction of reward or, in cases which intentionally compromise the network's integrity, the validator 204 losing some or all of its stake to other validators 204, informants or the stakeholders (through burning). For example, a validator 204 who attempts to ratify both branches of a fork (sometimes known as a "short-range" attack) may be identified and punished in the latter way.

Long-range "nothing-at-stake" attacks are circumvented through a simple "checkpoint" latch which prevents a dangerous chain-reorganization of more than a particular chain-depth. To ensure newly-syncing clients are not able to be fooled onto the wrong chain, regular "hard forks" will occur (of at most the same period of the validators' bond liquidation) that hard-code recent checkpoint block hashes into clients. This plays well with a further footprint-reducing measure of "finite chain length" or periodic resetting of the genesis-block.

Parachains and Collators

Each parachain 212 (e.g., parachain 212a and parachain 212b in FIG. 2) gets similar security affordances to the relay-chain 214: the parachains' 212 headers are sealed within the relay-chain block ensuring no reorganization, or "double-spending", is possible following confirmation. This is a similar security guarantee to that offered by Bitcoin's side-chains and merge-mining. Polkadot, however, also provides strong guarantees that the parachains' 212 state transitions are valid. This happens through the set of validators 204 being cryptographically randomly segmented into subsets; one subset per parachain 212, the subsets potentially differing per block. This setup generally implies that parachains' 212 block times may be at least as long as that of the relay-chain 214. In one implementation, the partitioning can be based either around a commit-reveal framework like the RanDAO or use data combined from previous blocks of each parachain 212 under a cryptographically secure hash.

Such subsets of validators 204 provide a parachain 212 block candidate which is guaranteed valid (on pain of bond confiscation). Validity revolves around two important points; firstly, that it is intrinsically valid—that all state transitions were executed faithfully and that all external data referenced (i.e. transactions) is valid for inclusion. Secondly, that any data which is extrinsic to its candidate, such as those external transactions, has sufficiently high availability so that participants are able to download it and execute the block manually. Validators 204 may provide only a "null" block containing no external "transactions" data but may run the risk of getting a reduced reward if they do. They work alongside a parachain gossip protocol with collators—individuals who collate transactions into blocks and provide a non-interactive, zero-knowledge proof that the block constitutes a valid child of its parent (and taking any transaction fees for their trouble).

It is left to parachain protocols to specify their own means of spam-prevention: there is no fundamental notion of "compute-resource metering" or "transaction fee" imposed by the relay-chain. There is also no direct enforcement on this by the relay-chain protocol (though it is unlikely that the stakeholders would choose to adopt a parachain which didn't provide a decent mechanism). This is an explicit nod to the possibility of chains unlike Ethereum, a Bitcoin-like chain which has a much simpler fee model or some other, yet-to-be-proposed spam-prevention model.

In one implementation, Polkadot's relay-chain itself can probably exist as an Ethereum-like accounts and state chain, executing on-chain logic with some virtual machine, possibly an EVM derivative. Since the relay-chain nodes do substantial other processing, transaction throughput can be reduced or minimized partly through large transaction fees and possibly a block size limit.

Interchain Communication

Polkadot enables interchain communication. Since parachains can have some sort of information channel between them, Polkadot can be considered a scalable multi-chain. In the case of Polkadot, the communication is as simple as can be: transactions executing in a parachain are (according to the logic of that chain) able to effect the dispatch of a transaction into a second parachain or, potentially, the relay-chain. Like external transactions on production blockchains, they are fully asynchronous and there is no intrinsic ability for them to return any kind of information back to its origin.

To ensure minimal implementation complexity, minimal risk and minimal straight-jacketing of future parachain architectures, these interchain transactions are effectively indistinguishable from standard externally-signed transactions. The transaction has an origin segment, providing the ability to identify a parachain, and an address which may be of arbitrary size. Unlike common current systems such as Bitcoin and Ethereum, interchain transactions do not come with any kind of "payment" of fee associated; any such payment is be managed through negotiation logic on the source and destination parachains. A system such as that proposed for Ethereum's Serenity release would be a simple means of managing such a cross-chain resource payment, though others may come to the fore in due course.

Figure 3:
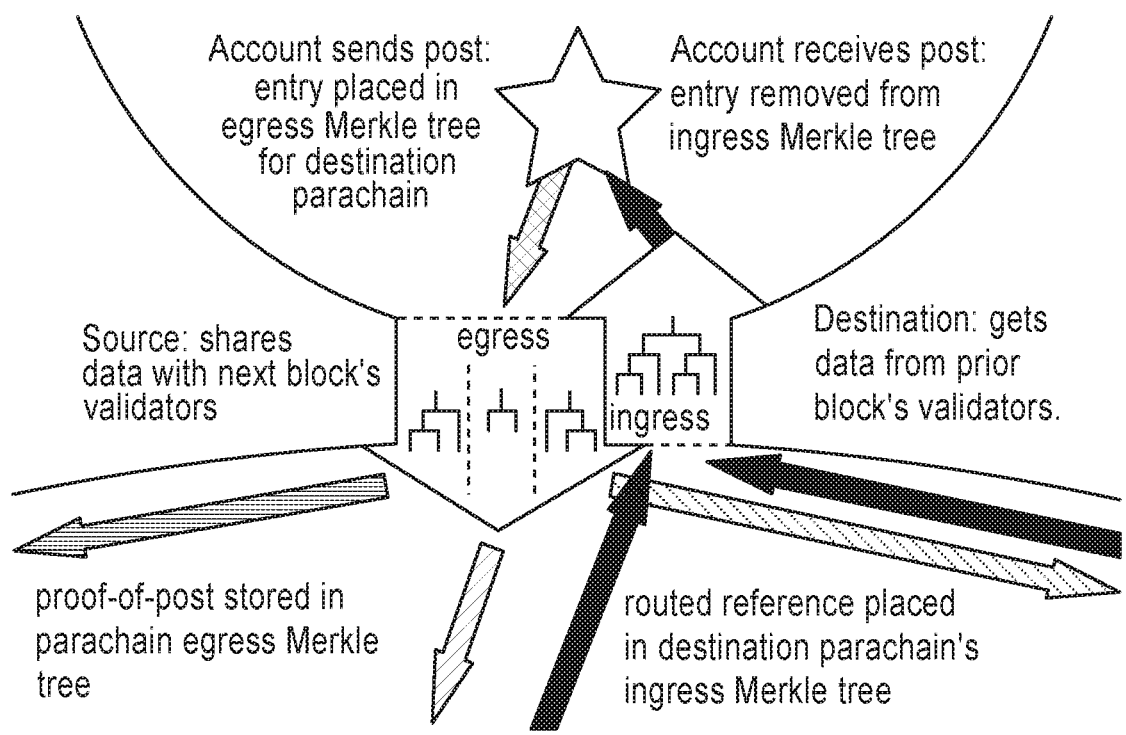
FIG. 3 illustrates a basic schematic showing the main parts of routing for posted transactions.

Interchain transactions can be resolved using a simple queuing mechanism based around a Merkle tree to ensure fidelity. It is the task of the relay-chain maintainers to move transactions on the output queue of one parachain into the input queue of the destination parachain. The passed transactions get referenced on the relay-chain, however are not relay-chain transactions themselves. To prevent a parachain from spamming another parachain with transactions, for a transaction to be sent, the destination's input queue should not be too large at the time of the end of the previous block. If the input queue is too large after block processing, then it is considered "saturated" and no transactions may be routed to it within subsequent blocks until reduced back below the limit. These queues are administered on the relay-chain allowing parachains to determine each other's saturation status; this way a failed attempt to post a transaction to a stalled destination may be reported synchronously. (Though since no return path exists, if a secondary transaction failed for that reason, it could not be reported back to the original caller and some other means of recovery would have to take place). FIG. 3 illustrates a basic schematic showing the main parts of routing for posted transactions (also referred as "posts").

Polkadot and Ethereum

Due to Ethereum's Turing completeness, Polkadot and Ethereum can be interoperable with each other, at least within some easily deducible security bounds. In one implementation, the transactions from Polkadot can be signed by validators and then fed into Ethereum where they can be interpreted and enacted by a transaction-forwarding contract. In the other direction, specially formatted logs (events) coming from a "break-out contract" can be used to allow a swift verification that a message should be forwarded.

Polkadot to Ethereum

Through the choice of a BFT consensus mechanism with validators formed from a set of stakeholders determined through an approval voting mechanism, a consensus can be secured with an infrequently changing and modest number of validators. In a system with a total of 144 validators, a block time of 4 seconds and a 900-block finality (allowing for malicious behavior such as double-votes to be reported, punished and repaired), the validity of a block can reasonably be considered proven through as little as 97 signatures (two-thirds of 144 plus one) and a following 60-minute verification period where no challenges are deposited.

Ethereum can host a "break-in contract" which can maintain the 144 signatories and be controlled by them. Since elliptic curve digital signature (ECDSA) recovery takes only 3,000 gas under the EVM, and since the validation may happen on a super-majority of validators (rather than full unanimity), the base cost of Ethereum confirming that an instruction was properly validated as coming from the Polkadot network would be no more than 300,000 gas-a mere 6% of the total block gas limit at 5.5M. Increasing the number of validators (as would be necessary for dealing with dozens of chains) inevitably increases this cost, however it is broadly expected for Ethereum's transaction bandwidth to grow over time as the technology matures and infrastructure improves. Together with the fact that not all validators need to be involved (only the highest staked validators may be called upon for such a task) the limits of this mechanism extend reasonably well.

Assuming a daily rotation of such validators (which is conservative-weekly or even monthly may be acceptable), then the cost to the network of maintaining this Ethereum-forwarding bridge would be around 540,000 gas per day or, at present gas prices, $45 per year. A basic transaction forwarded alone over the bridge would cost around $0.11; additional contract computation would cost more, of course. By buffering and bundling transactions together, the break-in authorization costs can easily be shared, reducing the cost per transaction substantially; if 20 transactions were performed before forwarding, then the cost for forwarding a basic transaction would fall to around $0.01.

One interesting, and cheaper, alternative to this multi-signature contract model would be to use threshold signatures to achieve the multi-lateral ownership semantics. While threshold signature schemes for ECDSA are computationally expensive, those for other schemes such as Schnorr signatures are very reasonable. Ethereum plans to introduce primitives which would make such schemes cheap to use in the upcoming Metropolis hard-fork. If such a means were able to be utilized, the gas costs for forwarding a Polkadot transaction into the Ethereum network would be dramatically reduced to a near zero overhead over and above the basic costs for validating the signature and executing the underlying transaction.

In this model, Polkadot's validator nodes would have to do little other than sign messages. To get the transactions actually routed onto the Ethereum network, the validators themselves can reside on the Ethereum network or small bounties can be offered to the first actor who forwards the message on to the network (the bounty could trivially be paid to the transaction originator).

Ethereum to Polkadot

Getting transactions to be forwarded from Ethereum to Polkadot uses the simple notion of logs. When an Ethereum contract wishes to dispatch a transaction to a particular parachain of Polkadot, it can simply call into a special "break-out contract". The break-out contract would take any payment that may be required and issue a logging instruction so that its existence may be proven through a Merkle proof and an assertion that the corresponding block's header is valid and canonical.

Of the latter two conditions, validity is perhaps the most straightforward to prove. In principle, the only requirement is for each Polkadot node needing the proof (i.e. appointed validator nodes) to be running a fully synchronized instance of a standard Ethereum node. Unfortunately, this is itself a rather heavy dependency. A more lightweight method would be to use a simple proof that the header was evaluated correctly through supplying only the part of Ethereum's state trie needed to properly execute the transactions in the block and check that the logs (contained in the block receipt) are valid. Such "SPV-like" proofs may yet involve a substantial amount of information; conveniently, they would typically not be needed at all: a bond system inside Polkadot would allow bonded third-parties to submit headers at the risk of losing their bond should some other third-party (such as a "fisherman", see section on bond confiscating/burning below) provide a proof that the header is invalid (specifically that the state root or receipt roots were impostors).

On a non-finalizing PoW network like Ethereum, the canonicality is impossible to proof conclusively. To address this, applications that attempt to rely on any kind of chain-dependent cause-effect wait for several "confirmations", or until the dependent transaction is at some particular depth within the chain. On Ethereum, this depth varies from 1 block for the least valuable transactions with no known network issues to 1200 blocks as was the case during the initial Frontier release for exchanges. On the stable "Homestead" network, this figure sits at 120 blocks for most exchanges, and a similar parameter can be used for Polkadot.

A Polkadot-side Ethereum-interface can have some simple functions: to be able to accept a new header from the Ethereum network and validate the PoW, to be able to accept some proof that a particular log was emitted by the Ethereum-side break-out contract for a header of sufficient depth (and forward the corresponding message within Polkadot) and finally to be able to accept proofs that a previously accepted but not-yet-enacted header contains an invalid receipt root.

To get the Ethereum header data itself (and any SPV proofs or validity/canonicality refutations) into the Polkadot network, an incentivization for forwarding data is useful. This could be as simple as a payment (funded from fees collected on the Ethereum side) paid to anyone able to forward a useful block whose header is valid. Validators would be called upon to retain information relating to the last few thousand blocks in order to manage forks, either through some protocol-intrinsic means or through a contract maintained on the relay chain.

Polkadot and Bitcoin

Bitcoin interoperation presents an interesting challenge for Polkadot: a so-called "two-way peg" would be a useful piece of infrastructure to have on the side of both networks. However, due to the limitations of Bitcoin, providing such a peg securely is a non-trivial undertaking. Delivering a transaction from Bitcoin to Polkadot can in principle be done with a process like that for Ethereum; a "break-out address" controlled in some way by the Polkadot validators could receive transferred tokens (and data sent alongside them). SPV proofs could be provided by incentivized oracles and, together with a confirmation period, a bounty given for identifying non-canonical blocks implying the transaction has been "double-spent". Any tokens then owned in the "break-out address" would then, in principle, be controlled by those same validators for later dispersal.

The problem however is how the deposits can be securely controlled from a rotating validator set. Unlike Ethereum which can make arbitrary decisions based upon combinations of signatures, Bitcoin is substantially more limited, with most clients accepting only multi-signature transactions with a maximum of 3 parties. Extending this to 36, or indeed thousands as might ultimately be desired, is impossible under the current protocol. One option is to alter the Bitcoin protocol to enable such functionality, however so-called "hard forks" in the Bitcoin world are difficult to arrange judging by recent attempts. One possibility is the use of threshold signatures, cryptographic schemes to allow a singly identifiable public key to be effectively controlled by multiple secret "parts", some or all of which are utilized to create a valid signature. Unfortunately, threshold signatures compatible with Bitcoin's ECDSA are computationally expensive to create and of polynomial complexity. Other schemes such a Schnorr signatures provide far lower costs, however the timeline on which they may be introduced into the Bitcoin protocol is uncertain.

Since the ultimate security of the deposits rests with several bonded validators, one other option is to reduce the multi-signature key-holders to only a heavily bonded subset of the total validators such that threshold signatures become feasible (or, at worst, Bitcoin's native multi-signature is possible). This of course reduces the total amount of bonds that could be deducted in reparations should the validators behave illegally; however, this is a graceful degradation, simply setting an upper limit of the amount of funds that can securely run between the two networks (or indeed, on the % losses should an attack from the validators succeed).

It is not unrealistic to place a reasonably secure Bitcoin interoperability "virtual parachain" between the two networks, though nonetheless a substantial effort with an uncertain timeline and quite possibly involving the cooperation of the stakeholders within that network.

Protocol in Depth

The protocol can be roughly broken down into three parts: the consensus mechanism, the parachain interface and interchain transaction routing.

Relay-Chain Operation

The relay-chain will likely be a chain broadly like Ethereum in that it is state-based with the state mapping address to account information, mainly balances and (to prevent replays) a transaction counter. Placing accounts here fulfils one purpose: to provide accounting for which identity possesses what amount of stake in the system. There may be notable differences, though: (1) Contracts cannot be deployed through transactions; following from the desire to avoid application functionality on the relay-chain, it will not support public deployment of contracts. (2) Compute resource usage ("gas") is not accounted; since the only functions available for public usage may be fixed, the rationale behind gas accounting no longer holds. As such, a flat fee structure may apply, allowing for more performance from a dynamic code execution and a simpler transaction format. (3) Special functionality is supported for listed contracts that allows for auto-execution and network-message outputs.

The relay chain's logic is based on WebAssembly (Wasm) back-end with an overall structure comprising of various modules, including those for consensus, validator management, governance, and parachain administration. There would be no need for the built-in contracts with Wasm being a viable target for general purpose languages rather than the immature and limited languages for the EVM.

Other likely deviations from the present Ethereum protocol are quite possible, for example a simplification of the transaction-receipt format allowing for the parallel execution of non-conflicting transactions within the same block, as proposed for the Serenity series of changes.

It is possible, though unlikely, that a Serenity-like "pure" chain be deployed as the relay-chain, allowing for a contract to manage things like the staking token balances rather than making that a fundamental part of the chain's protocol. This may be unlikely to offer a sufficiently great protocol simplification to be worth the additional complexity and uncertainty.

There are a few small pieces of functionality used for administrating the consensus mechanism, validator set, validation mechanism and parachains. These could be implemented together under a monolithic protocol. However, for reasons of auguring modularity, these can be described as "contracts" of the relay-chain. This should be taken to mean that they are objects (in the sense of object-orientated programming) managed by the relay-chain's consensus mechanism, but not necessarily that they are defined as programs in EVM-like opcodes, nor even that they be individually addressable through the account-system.

Staking Contract

This contract maintains the validator set. It manages: which accounts are currently validators; which are available to become validators at short notice; which accounts have placed stake nominating to a validator; properties of each including staking volume, acceptable payout-rates and addresses and short-term (session) identities.

It allows an account to register a desire to become a bonded validator, to nominate to some identity, and for preexisting bonded validators to register their desire to exit this status. It also includes the machinery itself for the validation and canonicalization mechanism.

Stake-Token Liquidity

It is generally desirable to have as much of the total staking tokens as possible to be staked within the network maintenance operations since this directly ties the network security to the overall "market capitalization" of the staking token. This can easily be incentivized through inflating the currency and handing out the proceeds to those who participate as validators. However, to do so presents a problem: if the token is locked in the Staking Contract under punishment of reduction, how can a substantial portion remain sufficiently liquid to allow price discovery?

One answer to this is allowing a straight-forward derivative contract, securing fungible tokens on an underlying staked token. This is difficult to arrange in a trust-free manner. Furthermore, these derivative tokens cannot be treated equally for the same reason that different Eurozone government's bonds are not fungible: there is a chance of the underlying asset failing and becoming worthless. With Eurozone governments, there could be a default. With validator-staked tokens, the validator may act maliciously and be punished.

Consider a simple solution: not all tokens be staked. This would mean that some proportion (perhaps 20%) of tokens will forcibly remain liquid. Though this is imperfect from a security perspective, it is unlikely to make a fundamental difference in the security of the network; 80% of the reparations possible from bond-confiscations would still be able to be made compared to the "perfect case" of 100% staking.

The ratio between staked and liquid tokens can be targeted simply through a reverse auction mechanism. Essentially, token holders interested in being a validator would each post an offer to the staking contract stating the minimum payout-rate that they would require to take part. At the beginning of each session (sessions would happen regularly, perhaps as often as once per hour) the validator slots would be filled according to each would-be validator's stake and payout rate. One possible process for this would be to take those with the lowest offers who represent a stake no higher than the total stake targeted divided by the number of slots and no lower than a lower-bound of half that amount. If the slots cannot be filled, the lower bound could be repeatedly reduced by some factor to satisfy.

Nominating

It is possible to trustlessly nominate ones staking tokens to an active validator, giving them the responsibility of validators duties. Nominating works through an approval-voting system. Each would-be nominator can post an instruction to the staking contract expressing one or more validator identities under whose responsibility they are prepared to entrust their bond.

Each session, nominators' bonds are dispersed to be represented by one or more validators. The dispersal algorithm, possibly on-chain, optimizes for a set of validators of equivalent total bonds. Nominators' bonds become under the effective responsibility of the validator and gain interest or suffer a punishment-reduction accordingly.

Bond Confiscation/Burning

Certain validator behavior results in a punitive reduction of their bond. If the bond is reduced below the allowable minimum, the session is prematurely ended, and another started. A non-exhaustive list of punishable validator misbehavior includes: being part of a parachain group unable to provide consensus over the validity of a parachain block; actively signing for the validity of an invalid parachain block; inability to supply egress payloads previously voted as available; inactivity during the consensus process; validating relay-chain blocks on competing forks.

Some cases of misbehavior threaten the network's integrity (such as signing invalid parachain blocks and validating multiple sides of a fork) and as such result in effective exile through the total reduction of the bond. In other, less serious cases (inactivity in the consensus process) or cases where blame cannot be precisely allotted (being part of an ineffective group), a small portion of the bond may instead be fined. In the latter case, this works well with sub-group churn to ensure that malicious nodes suffer substantially more loss than the collaterally-damaged benevolent nodes.

In some cases (multi-fork validation and invalid sub-block signing) validators cannot themselves easily detect each other's misbehavior since constant verification of each parachain block would be too arduous a task. Here, the parties external to the validation process verify and report such misbehavior. The parties get a reward for reporting such activity; their term, "fishermen" stems from the unlikeliness of such a reward.

Since these cases are typically very serious, any rewards can easily be paid from the confiscated bond. In general, the preference is to balance burning (reduction to nothing) with reallocation, rather than attempting wholesale reallocation. This has the effect of increasing the overall value of the token, compensating the network in general to some degree rather than the specific party involved in discovery. This is mainly as a safety mechanism: the large amounts involved could lead to extreme and acute behavior incentivization were they all bestowed on a single target.

In general, it is important that the reward is sufficiently large to make verification worthwhile for the network, yet not so large as to offset the costs of fronting a well-financed, well-orchestrated "industrial-level" criminal hacking attack on some unlucky validator to force misbehavior.

In this way, the amount claimed should generally be no greater than the direct bond of the errant validator, lest a perverse incentive arise of misbehaving and reporting oneself for the bounty. This can be combated either explicitly through a minimum direct bond requirement for being a validator or implicitly by educating nominators that validators with little bonds deposited have no great incentive to behave well.

Parachain Registry

Each parachain is defined in this registry. It is a relatively simple database-like construct and holds both static and dynamic information on each chain.

Static information includes the chain index (a simple integer), along with the validation protocol identity, a means of distinguishing between the different classes of parachain so that the correct validation process can be run by validators consigned to putting forward a valid candidate. An initial proof-of-concept would focus on placing the new validation processes into clients themselves, effectively requiring a hard fork of the protocol each time an additional class of chain were added. Ultimately, though, it may be possible to specify the validation process in a way both rigorous and efficient enough that clients are able to effectively work with new parachains without a software upgrade or hard-fork. One possible avenue to this would be to specify the parachain validation process in a well-established, natively-compiled, platform-neutral language such as WebAssembly.

Dynamic information includes aspects of the transaction routing system that must have global agreement such as the parachain's ingress queue (described in the section on Interchain Transaction Routing).

The registry can have parachains added only through full referendum voting; this could be managed internally but would more likely be placed in an external referendum contract in order to facilitate re-usage under more general governance components. The parameters to voting requirements (any quorum required, majority required) for registration of additional chains and other, less formal system upgrades may be set out in a "master constitution" but are likely to follow a traditional path, at least initially. The precise formulation is out of scope for the present work, but a two thirds super-majority to pass with more than one third of total system stake voting positively may be a sensible starting point.

Additional operations include the suspension and removal of parachains. Suspension would hopefully never happen; however, it is designed to be a safeguard least there be some intractable problem in a parachain's validation system. The most obvious instance where it might be useful is a consensus-critical difference between implementations leading validators to be unable to agree on validity or blocks. Validators would be encouraged to use multiple client implementations in order that they are able to spot such a problem prior to bond confiscation.

Since suspension is an emergency measure, it would be under the auspices of the dynamic validator-voting rather than a referendum. Re-instating would be possible both from the validators or a referendum.

The removal of parachains altogether could come after a referendum and with a substantial grace period to allow an orderly transition to either a standalone chain or to become part of some other consensus-system. The grace period would likely be of the order of months and is likely to be set out on a per-chain basis in the parachain registry in order that different parachains can enjoy different grace periods.

Sealing Relay Blocks

Sealing refers to the process of canonicalization; that is, a basic data transform which maps the original into something fundamentally singular and meaningful. Under a PoW chain, sealing is effectively a synonym for mining. In this case, it involves the collection of signed statements from validators over the validity, availability and canonicality of a particular relay-chain block and the parachain blocks that it represents.

The mechanics of the underlying BFT agreement process can be described using a primitive which assumes a consensus-creating state-machine. There are several promising BFT consensus processes in the core; Tangaroaa (a BFT variant of Raft), Tendermint and HoneyBadgerBFT. The sealing/consensus process intends to procure security for various parachains simultaneously, which is ensured with the economic incentives of a dispute resolution process after-the-fact.

One possible choice of a BFT agreement process for the relay chain is one which is specifically tailored to blockchains, by separating it from the initial block production process such that rather than obtaining agreement over every block individually, yielding agreement over growth of the chain in varying increments, applying votes on individual blocks to their ancestors transitively.

Regardless, assume that once consensus is reached, it is possible to record the consensus in an irrefutable proof which can be provided by any of the participants to it. Assume also that misbehavior within the protocol can be generally reduced to a small group containing misbehaving participants to minimize the collateral damage when dealing out punishment.

The proof, which takes the form of the signed statements, is placed in the relay-chain block's header together with certain other fields not least the relay-chain's state-trie root and transaction-trie root.

The sealing process takes place under a consensus-generating mechanism addressing the relay-chain's block and an economic attestation process for the parachains' blocks which make up part of the relay's content: parachains are not separately "committed" by their sub-groups and then collated later. This results in a more complex process for the relay-chain but allows us to complete the entire system's consensus in a single stage, minimizing latency and allowing for quite complex data-availability requirements which are helpful for the routing process below. Parachain candidates without enough initial economic attestation to validity and availability may not be included in a relay-chain block. Further economic attestations may be made after the point of initial inclusion.

The state of each participant's consensus machine may be modelled as a simple (2-dimensional) table. Each participant (validator) has a set of information, in the form of signed-statements ("votes") from other participants, regarding each parachain block candidate as well the relay-chain block candidate. The set of information is two pieces of data: (1) does this validator have egress transaction-post information from this block so they can properly validate parachain candidates on the following block? They may vote either 1 (known) or 0 (not yet known). Once they vote 1, they are committed to voting similarly for the rest of this process. Later votes that do not respect this are grounds for punishment. (2) is the parachain block valid and is all externally-referenced data (e.g. transactions) available? This is only relevant for validators assigned to the parachain on which they are voting. They may vote either 1 (valid), −1 (invalid) or 0 (not yet known). Once they vote non-zero, they are committed to voting this way for the rest of the process. Later votes that do not respect this are grounds for punishment.

All validators submit votes; votes may be resubmitted, qualified by the rules above. The progression of consensus may be modelled as multiple standard BFT agreement processes over each parachain happening in parallel. Since these are potentially thwarted by a relatively small minority of malicious actors being concentrated in a single parachain group, the consensus exists to establish a backstop, limiting the worst-case scenario from deadlock to merely one or more void parachain blocks (and a round of punishment for those responsible).

The basic rules for validity of the individual blocks (that allow the total set of validators as a whole to come to consensus on it becoming the unique parachain candidate to be referenced from the canonical relay): have at least some constant majority proportion of its validators voting positively and none voting negatively; have a tolerant set of validators voting positively to the availability of egress queue information.

If there is at least one positive and at least one negative vote on validity, an exceptional condition is created and the whole set of validators votes to determine if there are malicious parties or if there is an accidental fork. Aside from valid and invalid, a third kind of votes are allowed, equivalent to voting for both, meaning that the node has conflicting opinions. This could be due to the node's owner running multiple implementations which do not agree, indicating a possible ambiguity in the protocol.

After all votes are counted from the full validator set, if the losing opinion has at least some small proportion (to be parameterized; at most half, perhaps significantly less) of the votes of the winning opinion, then it is assumed to be an accidental parachain fork and the parachain is automatically suspended from the consensus process. Otherwise, it may be considered as a malicious act, and the minority who were voting for the dissenting opinion are punished.

The conclusion is a set of signatures demonstrating canonicality. The relay-chain block may then be sealed and the process of sealing the next block begun.

Improvements for Sealing Relay Blocks

While this sealing method gives strong guarantees over the system's operation, it does not scale out particularly well since every parachain's key information has its availability guaranteed by over one-third of all validators. This means that every validator's responsibility footprint grows as more chains are added.

While data availability within open consensus networks is essentially an unsolved problem, there are ways of mitigating the overhead placed on validator nodes. One simple solution is to realize that while validators should shoulder the responsibility for data availability, they need not actually store, communicate or replicate the data themselves. Secondary data silos, possibly related to (or even the very same) collators who compile this data, may manage the task of guaranteeing availability with the validators providing a portion of their interest/income in payment.

However, while this might buy some intermediate scalability, it still doesn't help the underlying problem; since adding more chains will in general involve additional validators, the ongoing network resource consumption (particularly in terms of bandwidth) grows with the square of the chains, an untenable property in the long-term.

Ultimately, there may be a fundamental limitation which states that for a consensus network to be considered available safe, the ongoing bandwidth requirements are of the order of total validators times total input information. This is due to the use of an untrusted network to properly distribute the task of data storage across many nodes, which sits apart from the eminently distributable task of processing.

Another possible, and indeed likely scenario to occur during the sealing process is one where multiple candidates from the same parachain receive a sufficient amount of statements and are thereby includable. The initial approach of including only a single candidate per parachain per relay chain block may then limit the throughput of the relay chain in this case.

Polkadot may select a winning parachain candidate block by means of a per-parachain ordering constraint and by means of the collator golden-ticket system. This could be extended with a parachain-specific "merge" process, by which multiple valid parachain candidate may be combined into a single one, and provided that all the source candidates had sufficient attestation, that the produced, consolidated candidate would also be considered to be well-supported. Furthermore, a similar approach may be used to consolidate short-term relay-chain forks.

As the complexity of maintaining a statement table grows quadratically with the number of participants, one further optimization would be to select subsets of validators as participants per relay-chain block, and advance only on a few parachains per relay-chain block while producing relay-chain blocks much faster.

Introducing Latency

One means of softening a fundamental limitation on bandwidth is to relax the notion of immediacy. Using 33%+1 validator voting for availability only eventually, and not immediately, better utilizes exponential data propagation and helps even out peaks in data-interchange. A reasonable equality (though unproven) may be:

$$\text{latency} = \text{participants} \times \text{chains} \quad (1)$$

Under the current model, the size of the system scales with the number of chains to ensure that processing is distributed; since each chain has at least one validator and the availability attestation is fixed to a constant proportion of validators, then participants similarly grows with the number of chains. This gives:

$$\text{latency} = \text{size} \quad (2)$$

Meaning that as the system grows, the bandwidth used and latency until availability is known across the network, which might also be characterized as the number of blocks before finality, increases with its square. This is a substantial growth factor and may turn out to be a notable road blocker and force us into "non-flat" paradigms such as composing several "Polkadots" into a hierarchy for multi-level routing of posts through a tree of relay-chains.

Public Participation

One more possible direction is to enlist public participation in the process through a micro-complaints system. Like the fishermen, there could be external parties to police the validators who claim availability. Their task is to find one who appears unable to demonstrate such availability. In doing so they can lodge a micro-complaint to other validators. PoW or a staked bond may be used to mitigate the sybil attack which would render the system largely useless.

Availability Guarantors

A final route would be to nominate a second set of bonded validators as "availability guarantors". These would be bonded just as with the normal validators and may even be taken from the same set (though if so, they would be chosen over a long-term period, at least per session). Unlike normal validators, they would not switch between parachains but rather would form a single group to attest to the availability of all important interchain data.

This has the advantage of relaxing the equivalence between participants and chains. Essentially, chains can grow (along with the original chain validator set), whereas the participants, and specifically those taking part in data-availability testament, can remain at the least sub-linear and quite possibly constant.

Collator Preferences

One important aspect of this system is to ensure that there is a healthy selection of collators creating the blocks in any given parachain. If a single collator dominated a parachain then some attacks become more feasible since the likelihood of the lack of availability of external data would be less obvious.

One option is to artificially weight parachain blocks in a pseudo-random mechanism to favor a wide variety of collators. In the first instance, part of the consensus mechanism may be that validators favor parachain block candidates determined to be "heavier". Similarly, incentivizing validators to attempt to suggest the weightiest block they can find could be done through making a portion of their reward proportional to the weight of their candidate.

To ensure that collators are given a reasonable fair chance of their candidate being chosen as the winning candidate in consensus, the specific weight of a parachain block candidate may depend on a random function connected with each collator. For example, taking the XOR distance measure between the collator's address and some cryptographically-secure pseudorandom number determined close to the point of the block being created (a notional "winning ticket"). This effectively gives each collator (or, more specifically, each collator's address) a random chance of their candidate block "winning" over all others.

Adding some inertia to a collator's address mitigates the sybil attack of a single collator "mining" an address close to the winning ticket and thus being a favorite each block. This may be as simple as using them to have a baseline amount of funds in the address. A more elegant approach would be to weight the proximity to the winning ticket with the amount of funds parked at the address in question. While modelling has yet to be done, it is quite possible that this mechanism enables even very small stakeholders to contribute as a collator.

Overweight Blocks

If a validator set is compromised, they may create and propose a block which though valid, takes an inordinate amount of time to execute and validate. This is a problem since a validator group could reasonably form a block which takes a very long time to execute unless some piece of information is already known allowing a short cut, factoring a large prime. If a single collator knew that information, then they would have a clear advantage in getting their own candidates accepted if the others were busy processing the old block. These blocks are "overweight."

Protection against validators submitting and validating these blocks largely falls under the same guise as for invalid blocks, though with an additional caveat: Since the time taken to execute a block (and thus its status as overweight) is subjective, the outcome of a vote on misbehavior will fall into essentially three camps. One possibility is that the block is not overweight—in this case more than some constant supermajority proportion declare that they could execute the block within some limit (50% of the total time allowed between blocks). Another is that the block is overweight—this would be if more than two—thirds declare that they could not execute the block within said limit. One final possibility is a fairly equal split of opinion between validators with some proportionate punishment.

To ensure validators can predict when they may be proposing an overweight block, it may be sensible to have them publish information on their own performance for each block. Over a sufficient period, this should allow them to profile their processing speed relative to the peers that would be judging them.

Collator Insurance

One issue remains for validators: unlike with PoW networks, to check a collator's block for validity, they execute the transactions in it. Malicious collators can feed invalid or overweight blocks to validators causing them grief (wasting their resources) and exacting a potentially substantial opportunity cost.

A simple strategy on the part of validators can mitigate this. Firstly, parachain block candidates sent to validators are signed from a relay chain account with funds; if they are not signed, then the validator should drop it immediately. Secondly, such candidates should be ordered in priority by a combination (multiplication) of the amount of funds in the account up to some cap, the number of previous blocks that the collator has successfully proposed in the past (not to mention any previous punishments), and the proximity factor to the winning ticket as discussed previously. The cap should be the same as the punitive damages paid to the validator in the case of them sending an invalid block.

To disincentivize collators from sending invalid or overweight block candidates to validators, any validator may issue a transaction including the offending block alleging misbehavior with the effect of transferring some or all of the funds in the misbehaving collator's account to the aggrieved validator. This type of transaction should not be front-run by the collator so he cannot remove the funds prior to the punishment. One method of accomplishing this would be to force collators to lock funds temporarily or alternatively, to ensure validators can include the transaction in the next block. The amount of funds transferred as damages is a dynamic parameter yet to be modelled but will likely be a proportion of the validator block reward to reflect the level of grief caused. To prevent malicious validators arbitrarily confiscating collators' funds, the collator may appeal the validator's decision with a jury of randomly chosen validators in return for placing a small deposit. If they find in the validator's favor, the deposit is consumed by them. If not, the deposit is returned, and the validator is fined (since the validator is in a much more vaulted position, the fine will likely be rather hefty).

Interchain Transaction Routing

I Interchain transaction routing is one of the essential maintenance tasks of the relay-chain and its validators. This is the logic which governs how a posted transaction (often shortened to simply "post") transforms from a desired output from one source parachain to a non-negotiable input of another destination parachain without any trust requirements.

These is no requirement for a transaction in the source parachain to have explicitly sanctioned this post. The only constraint upon the model is that parachains provide, packaged as a part of their overall block processing output, the posts which are the result of the block's execution.

These posts are structured as several FIFO queues; the number of lists is known as the routing base and may be around 16. Notably, this number represents the quantity of parachains that can be supported without having to resort to multi-phase routing. Polkadot may support this kind of direct routing as well as multi-phase routing process ("hyper-routing") for scaling out well past the initial set of parachains.

Assume that all participants know the sub-groupings for next two blocks n,n+1. In summary, the routing system follows these stages:

$Collator_s$: Contact members of Validators [n][S]

$Collator_s$: FOR EACH subgroup s: ensure at least 1 member of Validators [n][S] in contact $Collator_s$: FOR EACH subgroup s: assume egress [n−1][s][S] is available (all incoming post data to 'S' from last block)

$Collator_s$: Compose block candidate b for S: (b.header, b.ext, b.proof, b.receipt, b.egress)

$Collator_s$: Send proof information proof[S]=(b.header, b.ext, b.proof, b.receipt) to Validators [n][S]

$Collator_s$: Ensure external transaction data b.ext is made available to other collators and validators $Collator_s$: FOR EACH subgroup s: Send egress information egress [n][S][s]=(b.header, b.recept, b.egress[s]) to the receiving sub-group's members of next block Validators[n+1][S]

$Validator_v$: Pre-connect all same-set members for next block: let N=Chain[n+1][V]; connect all validators v such that Chain[n+1][v]=N $Validator_v$: Collate all data ingress for this block: FOR EACH subgroup s: Retrieve egress [n−1][s][Chain[n][V]], get from other validators v such that Chain[n][v]=Chain [n][V]. Possibly going via randomly selected other validators for proof of attempt.

$Validator_v$: Accept candidate proofs for this block proof [Chain[n][V]]. Vote block validity $Validator_v$: Accept candidate egress data for next block: FOR EACH subgroup s, accept egress[n][s][N]. Vote block egress availability; republish among interested validators v such that Chain [n+1][v]=Chain [n+1][V].

$Validator_v$: UNTIL CONSENSUS

Where: egress[n][from][to] is the current egress queue information for posts going from parachain 'from', to parachain 'to' in block number 'n'. $Collator_s$ is a collator for parachain S. Validators [n][S] is the set of validators for parachain s at block number n. Conversely, Chain[n]v is the parachain to which validator v is assigned on block number n. block.egress[to] is the egress queue of posts from some parachain block block whose destination parachain is to.

Since collators collect (transaction) fees based upon their blocks becoming canonical they are incentivized to ensure that for each next-block destination, the subgroup's members are informed of the egress queue from the present block. Validators are incentivized only to form a consensus on a (parachain) block, as such they care little about which collator's block ultimately becomes canonical. In principle, a validator could form an allegiance with a collator and conspire to reduce the chances of other collators' blocks becoming canonical, however this is both difficult to arrange due to the random selection of validators for parachains and could be defended against with a reduction in fees payable for parachain blocks which hold up the consensus process.

External Data Availability

Ensuring a parachain's external data is actually available is a perennial issue with decentralized systems aiming to distribute workload across the network. At the heart of the issue is the availability problem which states that since it is neither possible to make a non-interactive proof of availability nor any sort of proof of non-availability, for a BFT system to properly validate any transition whose correctness relies upon the availability of some external data, the maximum number of acceptably Byzantine nodes, plus one, of the system attests to the data being available.

For a system to scale out properly, like Polkadot, this invites a problem: if a constant proportion of validators attests to the availability of the data, and assuming that validators want to actually store the data before asserting it is available, then how can the problem of the bandwidth/storage requirements increasing with the system size (and therefore number of validators) be avoided? One answer would be to have a separate set of validators (availability guarantors), whose order grows sublinearly with the size of Polkadot as a whole. This is described in the section on "AVAILABILITY GUARANTORS."

There is also a secondary trick. As a group, collators have an intrinsic incentive to ensure that all data is available for their chosen parachain since without it they are unable to author further blocks from which they can collect transaction fees. Collators also form a group, membership of which is varied (due to the random nature of parachain validator groups) non-trivial to enter and easy to prove. Recent collators (perhaps of the last few thousand blocks) are therefore allowed to issue challenges to the availability of external data for a particular parachain block to validators for a small bond.

Validators contact those from the apparently offending validator sub-group who testified and either acquire and return the data to the collator or escalate the matter by testifying to the lack of availability (direct refusal to provide the data counts as a bond-confiscating offence, therefore the misbehaving validator will likely just drop the connection) and contacting additional validators to run the same test. In the latter case, the collator's bond is returned.

Once a quorum of validators who can make such non-availability testimonials is reached, they are released, the misbehaving sub-group is punished, and the block reverted.

Posts Routing

Each parachain header includes an egress-trie-root; this is the root of a trie containing the routing-base bins, each bin being a concatenated list of egress posts. Merkle proofs may be provided across parachain validators to prove that a particular parachain's block had a particular egress queue for a particular destination parachain.

At the beginning of processing a parachain block, each other parachain's egress queue bound for said block is merged into the block's ingress queue. Assume strong, probably CSPR, sub-block ordering to achieve a deterministic operation that offers no favoritism between any parachain block pairing. Collators calculate the new queue and drain the egress queues according to the parachain's logic.

The contents of the ingress queue are written explicitly into the parachain block. This has two main purposes: firstly, it means that the parachain can be trustlessly synchronized in isolation from the other parachains. Secondly, it simplifies the data logistics should the entire ingress queue not be able to be processed in a single block; validators and collators are able to process following blocks without having to source the queue's data specially.

If the parachain's ingress queue is above a threshold amount at the end of block processing, then it is marked saturated on the relay-chain and no further messages may be delivered to it until it is cleared. Merkle proofs are used to demonstrate fidelity of the collator's operation in the parachain block's proof.

Critique

One minor flaw relating to this basic mechanism is the post-bomb attack. This is where all parachains send the maximum amount of posts possible to a particular parachain. While this ties up the target's ingress queue at once, no damage is done over and above a standard transaction DoS attack.

Operating normally, with a set of well-synchronized and non-malicious collators and validators, for N parachains, N×M total validators and L collators per parachain, the total data pathways per block are:

Validator: M−1+L+L:M−1 for the other validators in the parachain set, L for each collator providing a candidate parachain block and a second L for each collator of the next block using the egress payloads of the previous block. (The latter is actually more like worst-case operation since it is likely that collators will share such data.)

Collator: M+kN:M for a connection to each relevant parachain block validator, kN for seeding the egress payloads to some subset of each parachain validator group for the next block (and possibly some favored collator(s)).

As such, the data path ways per node grow linearly with the overall complexity of the system. While this is reasonable, as the system scales into hundreds or thousands of parachains, some communication latency may be absorbed in exchange for a lower complexity growth rate. In this case, a multi-phase routing process may be used to reduce the number of instantaneous pathways at a cost of introducing storage buffers and latency.

Hyper-Cube Routing

Hyper-cube routing is a mechanism which can mostly be built as an extension to the basic routing mechanism described above. Essentially, rather than growing the node connectivity with the number of parachains and sub-group nodes, the node connectivity grows with the logarithm of parachains. Posts may transit between several parachains' queues on their way to final delivery.

Routing itself is deterministic and simple. Begin by limiting the number of bins in the ingress/egress queues; rather than being the total number of parachains, they are the routing-base (b). This may be fixed as the number of parachains changes, with the routing-exponent (e) instead being raised. Under this model, the message volume grows with $O(b^e)$, with the pathways remaining constant and the latency (or number of blocks for delivery) with $O(e)$.

Our model of routing is a hypercube of e dimensions, with each side of the cube having b possible locations. Each block, messages are routed along a single axis. The axis alternates in a round-robin fashion, thus guaranteeing worst-case delivery time of e blocks.

As part of the parachain processing, foreign-bound messages found in the ingress queue are routed immediately to the appropriate egress queue's bin, given the current block number (and thus routing dimension). This process involves additional data transfer for each hop on the delivery route, however this is a problem itself which may be mitigated by using some alternative means of data payload delivery and including only a reference, rather than the full payload of the post in the post-trie.

An example of such a hyper-cube routing for a system with 4 parachains, b=2 and e=2 might be:
Phase 0, on each message M:
$sub_0$: if $M_{dest} \in \{2,3\}$ then sendTo(2) else keep
$sub_1$: if $M_{dest} \in \{2,3\}$ then sendTo(3) else keep
$sub_2$: if $M_{dest} \in \{0,1\}$ then sendTo(0) else keep
$sub_3$: if $M_{dest} \in \{0,1\}$ then sendTo(1) else keep
Phase 1, on each message M:
$sub_0$: if $M_{dest} \in \{1,3\}$ then sendTo(1) else keep
$sub_1$: if $M_{dest} \in \{0,2\}$ then sendTo(0) else keep
$sub_2$: if $M_{dest} \in \{1,3\}$ then sendTo(3) else keep
$sub_3$: if $M_{dest} \in \{0,2\}$ then sendTo(2) else keep The two dimensions here are easy to see as the first two bits of the destination index; for the first block, the higher-order bit alone is used. The second block deals with the low-order bit. Once both happen (in arbitrary order) then the post may be routed.

Maximizing Serendipity

One alteration of the basic proposal would see a fixed total of $c^2-c$ validators, with c−1 validators in each sub-group. Each block, rather than there being an unstructured repartitioning of validators among parachains, instead for each parachain sub-group, each validator would be assigned to a unique and different parachain sub-group on the following block. This would lead to the invariant that between any two blocks, for any two pairings of parachain, there exists two validators who have swapped parachain responsibilities. While this cannot be used to gain absolute guarantees on availability (a single validator will occasionally drop offline, even if benevolent), it can nonetheless optimize the general case.

This approach is not without complications. The addition of a parachain may yield a reorganization of the validator set. Furthermore the number of validators, being tied to the square of the number of parachains, would start initially very small and eventually grow far too fast, becoming untenable after around 50 parachains. None of these are fundamental problems. In the first case, reorganization of validator sets is something that is done regularly anyway. Regarding the size of the validator set, when too small, multiple validators may be assigned to the same parachain, applying an integer factor to the overall total of validators. A multi-phase routing mechanism such as Hypercube Routing, discussed in the section on CRITITQUE would alleviate the requirement for large number of validators when there are many chains.

Parachain Validation

A validator's main purpose is to testify, as a well-bonded actor, that a parachain's block is valid, including but not limited to any state transition, any external transactions included, the execution of any waiting posts in the ingress queue and the final state of the egress queue. The process itself is simple. Once the validator sealed the previous block they are free to begin working to provide a candidate parachain block candidate for the next round of consensus.

Initially, the validator finds a parachain block candidate through a parachain collator (described next) or one of its co-validators. The parachain block candidate data includes the block's header, the previous block's header, any external input data included (for Ethereum and Bitcoin, such data would be referred to as transactions, however in principle they may include arbitrary data structures for arbitrary purposes), egress queue data and internal data to prove state-transition validity (for Ethereum this would be the various state/storage trie nodes used to execute each transaction). Experimental evidence shows this full dataset for a recent Ethereum block to be at the most a few hundred KiB.

Simultaneously, if not yet done, the validator may be attempting to retrieve information pertaining to the previous block's transition, initially from the previous block's validators and later from all validators signing for the availability of the data.

Once the validator has received such a candidate block, they then validate it locally. The validation process is contained within the parachain class's validator module, a consensus-sensitive software module written for any implementation of Polkadot (though in principle a library with a C ABI could enable a single library to be shared between implementations with the appropriate reduction in safety coming from having only a single "reference" implementation).

The process takes the previous block's header and verifies its identity through the recently agreed relay-chain block in which its hash should be recorded. Once the parent header's validity is ascertained, the specific parachain class's validation function may be called. This is a single function accepting several data fields (roughly those given previously) and returning a simple Boolean proclaiming the validity of the block.

Most such validation functions will first check the header-fields which are able to be derived directly from the parent block (e.g. parent hash, number). Following this, they will populate internal data structures as appropriate to process transactions and/or posts. For an Ethereum-like chain this amounts to populating a trie database with the nodes that may be used for the full execution of transactions. Other chain types may have other preparatory mechanisms.

Once done, the ingress posts and external transactions (or whatever the external data represents) may be enacted, balanced according to chain's specification. (A sensible default might be to have ingress posts be processed before external transactions be serviced, however this should be for the parachain's logic to decide.) Through this enactment, a series of egress posts may be created and it may be verified that these do indeed match the collator's candidate. Finally, the properly populated header may be checked against the candidate's header.

With a fully validated candidate block, the validator can then vote for the hash of its header and send all requisite validation information to the co-validators in its sub-group.

Parachain Collators

Parachain collators are unbonded operators who fulfill much of the task of miners on the present-day blockchain networks. They are specific to a parachain. To operate, they maintain both the relay-chain and the fully synchronized parachain.

The precise meaning of "fully synchronized" will depend on the class of parachain, though will always include the present state of the parachain's ingress queue. In Ethereum's case it also involves at least maintaining a Merkle-tree database of the last few blocks but might also include various other data structures including Bloom filters for account existence, familial information, logging outputs and reverse lookup tables for block number.

In addition to keeping the two chains synchronized, it also listens for and accumulate transactions by maintaining a transaction queue and accepting properly validated transactions from the public network. With the queue and chain, it can create new candidate blocks for the validators chosen at each block (whose identity is known since the relay-chain is synchronized) and submit them, together with the various ancillary information such as proof-of-validity, via the peer network.

For its trouble, it collects all fees relating to the transactions it includes. Various economics float around this arrangement. In a heavily competitive market where there is a surplus of collators, it is possible that the transaction fees be shared with the parachain validators to incentivize the inclusion of a collator's block. Similarly, some collators may even raise the fees to be paid in order to make the block more attractive to validators. In this case, a natural market should form with transactions paying higher fees skipping the queue and having faster inclusion in the chain.

Networking

Networking on traditional blockchains like Ethereum and Bitcoin has rather simple requirements. All transactions and blocks are broadcast in a simple undirected gossip. Synchronization is more involved, especially with Ethereum but, this logic was contained in the peer strategy rather than the protocol itself which resolved around a few request and answer message types.

While Ethereum made progress on current protocol offerings with the devp2p protocol, which allowed for many subprotocols to be multiplexed over a single peer connection and thus have the same peer overlay support many p2p protocols simultaneously, the Ethereum portion of the protocol remained relatively simple and the p2p protocol as a while remains unfinished with important functionality missing such as QoS support. Sadly, a desire to create a more ubiquitous "web 3" protocol largely failed, with the only projects using it being those explicitly funded from the Ethereum crowd-sale.

Polkadot is rather more substantial. Rather than a wholly uniform network, Polkadot has several types of participants each with different requirements over their peer makeup and several network "avenues" whose participants will tend to converse about data. This means a substantially more structured network overlay—and a protocol supporting that—may be useful. Furthermore, extensibility to facilitate future additions such as new kinds of "chain" may themselves use a novel overlay structure.

In one implementation, the network participants can be broken down into two sets (relay-chain, parachains) each of three subsets. Each parachain participant is only interested in conversing with participants in the same parachain as opposed to participants in other parachains:

Relay-chain participants:
  Validators: P, split into subsets P[s] for each parachain
  Availability Guarantors: A (this may be represented by Validators in the basic form of the protocol)
  Relay-chain clients: M (note members of each parachain set will also tend to be members of M)
Parachain participants:
  Parachain Collators: C[0], C[1], . . . .
  Parachain Fishermen: F[0], F[1], . . . .
  Parachain clients: S[0], S[1], . . . .
  Parachain light-clients: L[0], L[1], . . . .

Classes of communication tend to take place between members of these sets:
  P|A↔P|A: The full set of validators/guarantors are well-connected to achieve consensus.
  P[s]↔C[s]|P[s]: Each validator as a member of a given parachain group will tend to gossip with other such members as well as the collators of that parachain to discover and share block candidates.
  A↔P[s]|C|A: Each availability guarantor should collect consensus-sensitive cross-chain data from the validators assigned to it; collators may also optimize the chance of consensus on their block by advertising it to availability guarantors. Once they have it, the data may be disbursed to other such guarantor to facilitate consensus.
  P[s]↔A|P[s']: Parachain validators should collect additional input data from the previous set of validators or the availability guarantors.
  F[s]↔P: When reporting, fishermen may place a claim with any participant.
  M↔M|P|A: General relay-chain clients disburse data from validators and guarantors.
  S[s]↔S[s]|P[s]|A: Parachain clients disburse data from the validator/guarantors.
  L[s]↔L[s]|S[s]: Parachain light clients disburse data from the full clients.

To ensure an efficient transport mechanism, a "flat" overlay network—like Ethereum's devp2p—where each node does not (non-arbitrarily) differentiate fitness of its peers is unlikely to be suitable. A reasonably extensible peer selection and discovery mechanism may be included within the protocol as well as aggressive planning an lookahead to ensure the right sort of peers are "serendipitously" connected at the right time.

The precise strategy of peer make-up may be different for each class of participant: for a properly scaled-out multichain, collators may continuously reconnect to the accordingly elected validators, or may use on-going agreements with a subset of the validators to ensure they are not disconnected during the clear majority of the time that they are useless for that validator. Collators may also attempt to maintain one or more stable connections into the availability guarantor set to ensure swift propagation of their consensus-sensitive data.

Availability guarantors will mostly aim to maintain a stable connection to each other and to validators (for consensus and the consensus-critical parachain data to which they attest), as well as to some collators (for the parachain data) and some fishermen and full clients (for dispersing information). Validators will tend to look for other validators, especially those in the same sub-group and any collators that can supply them with parachain block candidates.

Fishermen, as well as general relay-chain and parachain clients will generally aim to keep a connection open to a validator or guarantor, but plenty of other nodes like themselves otherwise. Parachain light clients will similarly aim to be connected to a full client of the parachain, if not just other parachain light-clients.

The Problem of Peer Churn

In the basic protocol proposal, each of these subsets constantly alter randomly with each block as the validators assigned to verify the parachain transitions are randomly elected. This can be a problem should disparate (non-peer) nodes desire to pass data between each other. One either relies on a fairly-distributed and well-connected peer network to ensure that the hop-distance (and therefore worst-case latency) only grows with the logarithm of the network size (a Kademlia-like protocol may help here), or one introduces longer block times to allow the connection negotiation to take place to keep a peer-set that reflects the node's current communication desires.

Neither of these are great solutions: long block times being forced upon the network may render it useless for particular applications and chains. Even a perfectly fair and connected network will result in substantial wastage of bandwidth as it scales due to uninterested nodes having to forward data useless to them.

While both directions may form part of the solution, a reasonable optimization to help minimize latency would be to restrict the volatility of these parachain validator sets, either reassigning the membership only between series of blocks (in groups of 15, which at a 4 second block time would mean altering connections only once per minute) or by rotating membership in an incremental fashion, changing by one member at a time (if there are 15 validators assigned to each parachain, then on average it would be a full minute between completely unique sets). Limiting the amount of peer churn and ensuring that advantageous peer connections are made well in advance through the partial predictability of parachain sets helps to ensure each node keeps a permanently serendipitous selection of peers.

Path to an Effective Network Protocol

The most effective and reasonable development effort may focus on utilizing a pre-existing protocol. Several peer-to-peer base protocols exist that may be used or augmented, including Ethereum's own devp2p, IPFS's libp2p and GNU's GNUnet. One implementation uses libp2p, but the internal components remain network-agnostic. A full review of these protocols and their relevance for building a modular peer network supporting certain structural guarantees, dynamic peer steering and extensible sub-protocols is well beyond the scope of this document but may be an important step in the implementation of Polkadot.

Practicalities of the Protocol

Interchain Transaction Payment

While a great amount of freedom and simplicity is gained through dropping the need for a holistic computation resource accounting framework like Ethereum's gas, this does raise an important question: without gas, how does one parachain avoid another parachain from forcing it to do computation? While it is possible to rely on transaction-post ingress queue buffers to prevent one chain from spamming another with transaction data, there is no equivalent mechanism provided by the protocol to prevent the spamming of transaction processing.

This is a problem left to the higher level. Chains are free to attach arbitrary semantics on to the incoming transaction-post data, ensuring that computation is paid-for before being started. In a similar vein to the model espoused by Ethereum Serenity, we can imagine a "break-in" contract within a parachain which allows a validator to be guaranteed payment in exchange for the provision of a particular volume of processing resources. These resources may be measured in something like gas but could also be some entirely novel model such as subjective time-to-execute or a Bitcoin-like flat-fee model.

On its own this isn't so useful since the off-chain caller may not have a value mechanism that is recognized by the break-in contract. However, there may be a secondary "break-out" contract in the source chain. The two contracts together would form a bridge, recognizing each other and providing value-equivalence. (Staking-tokens, available to each, could be used to settle the balance-of-payments.) Calling into another such chain would mean proxying through this bridge, which would provide the means of negotiating the value transfer between chains to pay for the computation resources used on the destination parachain.

Additional Chains

While the addition of a parachain is a relatively cheap operation, it is not free. More parachains means fewer validators per parachain and, eventually, a larger number of validators each with a reduced average bond. While the issue of a smaller coercion cost for attacking a parachain is mitigated through fishermen, the growing validator set essentially forces more latency due to the mechanics of the underlying consensus method. Furthermore, each parachain brings with it the potential to grief validators with an over-burdensome validation process.

As such, there may be some "price" that validators and/or the stake-holding community will extract for the addition of a new parachain. This market for chains will possibly see the addition of either: • Chains that likely have zero net contribution paying (in terms of locking up or burning staking tokens) to be made a part (consortium chains, Doge-chains, app-specific chains); • chains that deliver intrinsic value to the network through adding particular functionality difficult to get elsewhere (confidentiality, internal scalability, service tie-ins).

Essentially, the community of stakeholders should be incentivized to add child chains-either financially or through the desire to add featureful chains to the relay.

New chains added will have a very short notice period for removal, allowing for new chains to be experimented with without any risk of compromising the medium or long-term value proposition.

An Example Polkadot Implementation with Two Constituent Blockchains

A Polkadot implementation with two constituent blockchains includes at least one validator and two collators. Consider a case with two validators, V1 and V2 (it would work with even one, but that would only include a block from one parachain per relay chain block); two parachains, A and B; and two collators, C–A and C–B, collating on A and B, respectively.

Periodically, V1 and V2 are shuffled over parachains A and B using a non-influenceable piece of randomness called a "randomness beacon" drawn from prior relay-chain blocks. Consider that V1 is assigned to A and V2 is assigned to B.

V1 contacts a collator from parachain A, in this case C–A, and V2 contacts C–B. V1 and V2 each receive a parachain block from their respective collator and evaluate the parachain block's validity under parachain rules. If there are more than two collators, with each validator connected to more than one collator, the validators choose one of the parachain blocks as the candidate block from their respective collators based on a consensus.

At this point, both V1 and V2 each have a collated candidate block from their assigned parachain. They now participate in a consensus process where they each circulate statements of validity to their local parachain candidate and guarantee availability of the external data. For more than two validators, there is more than one validator assigned to each parachain. Only validators assigned to the same parachain produce statements on validity of each other's blocks, while all validators may be (again randomly) called on to guarantee availability. If there were multiple validators assigned to a parachain, they might also put forward a different candidate.

V1 and V2 complete the consensus process by sealing the valid and sufficiently-attested (via statements) parachain candidates into a relay-chain block.

Interchain messaging: the execution of a parachain candidate may yield some outgoing messages to other chains. For each parachain, there is an egress message queue to each other chain, which can be cryptographically referenced on-chain, while the messages themselves are part of the guaranteed available data. On each relay-chain block, each parachain is meant to be routed from various other parachains, e.g., in one implementation, using the hyper-cube routing disclosed herein. Collators on a given parachain fetch the message queue data from all the parachains being routed from, verify against the cryptographic reference on the relay-chain, and combine into the canonical ingress queue of messages. Any valid parachain candidate for that relay chain block should process the canonical ingress queue of messages being routed to the parachain.

Example Applications of Polkadot

Figure 4D:
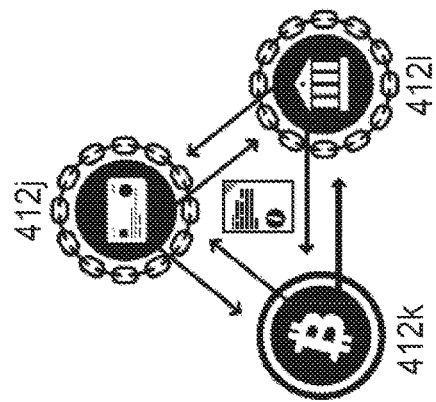
FIG. 4a-4d illustrate example applications of Polkadot.
Figure 4C:
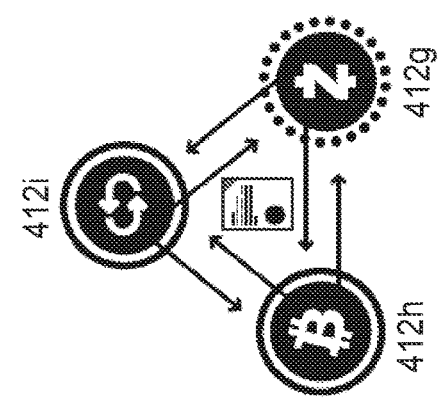
Figure 4B:
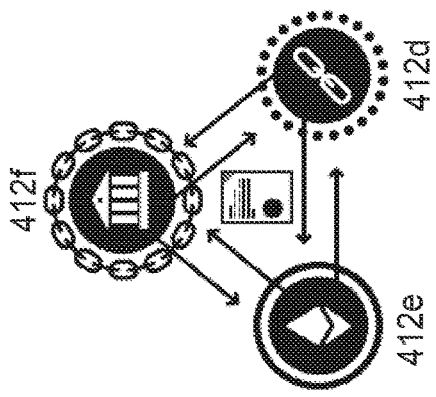
Figure 4A:
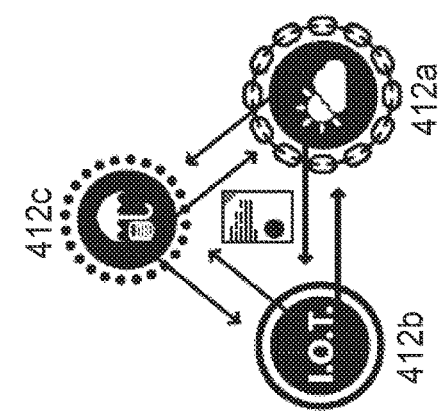

FIGS. 4A-4D illustrate example applications of Polkadot. As shown in FIG. 4A, a weather oracle 412a can confirm a hurricane, and IoT oracles 412b can confirm damage. Interoperability enabled by Polkadot can enable a private insurance chain 412c to issue a token to payout damages. Each of the weather oracle 412a, IoT oracle 412b, and insurance chain 412c should be considered as parachains whose security and communication is provided by an implicit relay chain (which is also implicit in FIGS. 4B-4D).

FIG. 4B shows a blockchain project 412d with crowdsale contributors on Ethereum 412e verified by a private bank 412f before accepting ETH. In this case, Ethereum 412e is still its own free-standing network, but is bridged to Polkadot using a "virtual parachain", which enables it to communicate with any public and private chains also connected to Polkadot. This virtual parachain would function in two parts: collators which provide well-secured Ethereum blocks to Polkadot validators, and bridge validators (perhaps the same as the Polkadot validators) which ferry messages in the opposite direction.

FIG. 4C shows a decentralized exchange parachain 412i that allows users to deposit BTC using Zero knowledge proofs using Zcash-like parachain 412g. Bitcoin 412h here is also implied to be bridged, and as a result of being connected to Polkadot, notably can be used for functionality well beyond the scope of the Bitcoin network currently.

FIG. 4D shows a payment processor private chain 412j that requires users to be verified with a private bank chain 412l to make purchases in BTC. Notable here is the extensive use of private chains, which are connected to Polkadot and can answer specifically-crafted queries, but do not yield governance or access to arbitrary data to the public, connected chains. Such private chains will have their own privileged collators for producing state updates, as general-purpose collators will not have access to the private state. The validators checking the state updates of private chains do not require any additional privileges or node capabilities.

Functional Components

Seen from a high-level, the Parity Polkadot Platform stack may include several functional components, including but not limited to:

Networking subsystem: This is how a peer network is formed and maintained. Simple alterations of existing peer-to-peer networking libraries (devp2p most likely) may be sufficient for an initial system. As the network grows, the network topology should become increasingly structured allowing for optimal data logistics. For the final deployment, adaptations of libp2p, devp2p and GNUnet should be first considered. If requirements are not likely to be met, then a new protocol should be considered.

Consensus mechanism: Proof-of-authority consensus mechanism supporting rich validator statements and allowing multiple independent items to be agreed upon under a single series based upon subjective reception of the partial set of validator statements. The mechanism should allow the proof of misbehavior for the dismissal of malicious validators but should not involve any staking mechanism. A substantial amount of research and prototyping will precede the development of this component.

Proof-of-stake chain: Extending the consensus mechanism into proof-of-stake territory; this module includes staking tokens, managing entry and exit from the validator pool, a market mechanism for determining validator rewards, finalizing the approval-voting nomination mechanism and managing bond-confiscation and dismissal.

Parachain implementation: A first parachain implementation, likely to be based heavily on an existing blockchain protocol such as Bitcoin or (more likely, since it provides for rich transactions) Ethereum. This will include an integration with the proof-of-stake chain, allowing the parachain to gain consensus without its own internal consensus mechanism.

Transaction processing subsystem: An evolution of the parachain and relay-chain, this will allow for transactions to be sent, received and propagated. It includes the designs of transaction queuing and optimized transaction routing on the network layer.

Transaction-routing subsystem: This introduces more specifics into the relay-chain's behavior. Adding transactability into parachains may be useful. Following that, with two modules hard-coded into the relay-chain, it will include the management of the ingress/egress queues. This along with the network protocol can develop as a means of directed transaction propagation, ensuring independent parachain collators are not overly exposed to transactions that are not of interest.

Relay chain: This is the final stage of the relay-chain, allowing the dynamic addition, removal and emergency pausing of parachains, the reporting of bad behavior and includes implementation of the "fisherman" functionality.

Independent collators: This is the delivery of an alternative chain-specific collator functionality. It includes proof creation (for collators), parachain misbehavior detection (for fishermen) and the validation function (for validators). It also includes any additional networking involved to allow the two to discover and communicate.

Network dynamics modelling and research: The overall dynamics of this protocol should be researched thoroughly. This can happen both through offline network modelling and through empirical evidence through simulated nodes. The latter is dependent on the relay-chain and will include the development of a structured logging protocol allowing nodes to submit detailed reports on their actions to a central hub for collation.

Network intelligence: As a complex decentralized multi-party network, a network intelligence hub like http://eth-stats.net is used to monitor the life-signs of the network as a whole and ag potentially disruptive behavior. Structured logging should be used to generate and visualize this data in real-time for maximum efficiency. It is dependent on the relay-chain being in a reasonably complete state.

Information publication platform: This is a mechanism for publishing data relating to the blockchain, and effectively means a decentralized content-discovery network. Initially it can be handled by basic peer-to-peer lookups but for deployment may use a more structured and robust solution since availability may become a useful piece of information. IPFS integration may be the most sensible means of achieving these goals.

Javascript interaction bindings: The main means of interacting with the network will likely follow the example of Ethereum and as such high-quality Javascript bindings are useful to have. The bindings cover interactions with the relay-chain and the initial parachain and as such depends on them.

Governance: Initially, this may be a meta-protocol on the relay-chain for managing exceptional events such as hard-forks, soft-forks and protocol reparameterization. It will include a modern structure to help manage conflict and prevent live-lock. Ultimately, this may become a full meta-protocol layer able to enact changes normally reserved for hard-forks.

Interaction platform: A platform by which "typical" users can interact with the system, along with minimal functionality to facilitate common tasks such as entering the bond process, voting, nomination, becoming a validator, fisherman or collator and staking token transfer. Depends upon having a functional relay-chain.

Light clients: Light-client technology for both the relay-chain and any parachains developed. This will allow clients to be able to gain information regarding activity on the chains with a high degree of trust-freedom and without any substantial requirement of storage or bandwidth. Depends upon the relay-chain.

Parachain UI: A multi-chain, multi-token wallet and identity management system. It uses light-client technology and the interaction platform. This is not needed for any initial network deployment.

On-chain Dapp services: There may be various services deployed on any initial parachains such as registration hubs for APIs, names, natural-language specifications and code. This depends on the parachain but is not strictly needed for any initial network deployment.

Application development tools: This includes various bits of software used to help developers. Examples include compilers, key management tools, data archivers and VM simulators. Many others exist. Technologies may be chosen partly to reduce or minimize the need for such tools. Many will not be strictly required.

Ethereum-as-a-parachain: Trust-free bridge to Ethereum and back again, allowing posted transactions to be routed from parachains into Ethereum (and treated like any other transaction of external origin) and allow Ethereum contracts to be able to post transactions to parachains and the accounts therein. Initially, this may be modelled to ascertain feasibility and get any structural limitations based around the number of validators used by the consensus process, a component on which it is dependent. A proof-of-concept can be built following this and final development may be dependent on the relay-chain itself.

Bitcoin-RPC compatibility layer: A simple RPC compatibility layer for the relay-chain allowing infrastructure already built using that protocol to be interoperable with Polkadot and as such minimize effort for support.

Web 2.0 bindings: Bindings into common Web 2.0 technology stacks to facilitate the usage of Polkadot infrastructure with legacy systems. A stretch goal dependent on the initial parachains and any on-chain infrastructure to be exposed.

zk-SNARKparachain example: A parachain utilizing the properties of zk-SNARKs to ensure identities of trans actors on it are kept private. A stretch goal dependent on the relay-chain.

Encrypted parachain example: A parachain that keeps each item of state encrypted and signed. These ensure the enforcement of access controls over inspection and modification of the data therein allowing commercial regulated operations to conform as appropriate. Would include proof-of-authority mechanisms to allow Polkadot validators to guarantee some degree of correctness of state transitions without gaining exposure to the underlying information. A stretch goal depending on the relay-chain.

Trust-free Bitcoin bridge: Trust-free Bitcoin "two-way-peg" functionality. This would possibly use threshold signatures or alternatively an n of m multi-signature Bitcoin account together with SPV proofs & specialized fishermen. Development is predicated on an initial feasibility analysis giving a favorable result. Some additional functionality may be added to (or unlocked from) the Bitcoin protocol to support this functionality.

Abstract/low-level decentralized applications: Trust-free token exchange, asset-tracking infrastructure, crowdsale infrastructure.

Contract language: Would include a safe contract language together with tutorials, guidelines and educational tools. It may include means of making formal proofs as per the original Solidity language vision or could be based around some other programming paradigm which helps reduce or minimize critical process errors such as functional programming or condition-oriented programming.

This disclosure outlines a direction one may take to author a scalable, heterogeneous multi-chain protocol with the potential to be backwards compatible to certain, pre-existing blockchain networks. Under such a protocol, participants work in enlightened self-interest to create an overall system which can be extended in an exceptionally free manner and without the typical cost for existing users that comes from a standard blockchain design. The disclosure details outline of the architecture including the nature of the participants, their economic incentives, and the processes under which they engage.

Network forking is always a possibility from divergent implementations of the protocol. The recovery from such an exceptional condition was not discussed. Given the network will likely have a non-zero period of finalization, it should not be a large issue to recover from the relay-chain forking, however this will involve careful integration into the consensus protocol.

Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed.

Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," about a list of one or more elements, should be understood to mean at least one element selected from any one or more of the elements in the list of elements, but not necessarily including at least one of each element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of evaluating and establishing a record of the validity of a candidate block independent of representing a state transition of a parallelized blockchain (parachain) independent of evaluating the state transition of the parachain, the method comprising:

receiving, at a validator node in a relay blockchain (relay chain), a header and a state-transition proof associated with the candidate block from a collator node in the parachain, the parachain being one of a plurality of heterogeneous parachains, the candidate block representing the state transition of the parachain;

determining, at the validator node, that the state transition represented by the candidate block is valid and that extrinsic data referenced by the candidate block is valid and can be accessed for execution based on the header and the state-transition proof, the extrinsic data comprising external transactions referenced by the candidate block;

rebroadcasting the candidate block to at least one other validator node in the relay chain in response to determining that the candidate block is valid and that the extrinsic data referenced by the candidate block is valid and can be accessed for execution;

broadcasting a statement about validity and availability of the candidate block to the at least one other validator node in the relay chain;

forming a consensus among the validator node and the at least one other validator node that the state transition represented by the candidate block is valid, wherein the consensus is based on the statement about validity and availability of the candidate block;

in response to the consensus among the validator node and the at least one other validator node that the state transition is valid, sealing the candidate block in the relay chain within a relay-chain block with the header sealed in the relay-chain block to prevent reorganization of the parachain, wherein the sealing the candidate block in the relay chain comprises collecting the statement about the validity and availability of the candidate block signed by the validator note and the at least one other validator node; and monitoring, by a fisherman node, the statement about validity and availability of the candidate block of the validator node to prevent illegal actions of the validator node.

2. The method of claim 1, wherein the collator node is a unique actor for the parachain.

3. The method of claim 1, wherein the candidate block references a header of a previously included candidate block of the parachain, external input or ingress data, and egress queue data.

4. The method of claim 1, wherein the determining that the candidate block is valid and that the extrinsic data referenced by the candidate block is valid and can be accessed for execution includes:
verifying the state-transition proof according to validation logic stored on the relay chain.

5. The method of claim 1, wherein the monitoring comprises:
receiving the candidate block at the fisherman node.

6. The method of claim 5, wherein the monitoring further comprises:
receiving the statement about validity and availability of the candidate block at the fisherman node.

7. The method of claim 6, wherein the monitoring further comprises:
receiving a challenge to the validity of the candidate block from the fisherman node; and
initiating a dispute resolution process to confirm or reject the challenge.

8. The method of claim 7, wherein the monitoring further comprises:
observing, at the validator node, the dispute resolution process; and
issuing, at the validator node, a confirmation or rejection of the challenge.

9. The method of claim 1, further comprising:
participating in a consensus process, by the validator node, to determine that a proposed relay chain block is a canonical relay chain block.

10. The method of claim 1, wherein the parachain is an open blockchain and the plurality of heterogeneous parachains comprises a closed blockchain.

11. The method of claim 1, wherein the relay chain is a first relay chain in a tree of relay chains.

12. The method of claim 1, further comprising:
trustlessly synchronizing the parachain with the relay chain in isolation from other parachains in the heterogeneous plurality of parachains.

13. The method of claim 1, wherein the determining that the candidate block is valid and that the extrinsic data referenced by the candidate block is valid and can be accessed for execution comprises determining, by the validator node, that the candidate block constitutes a valid child of the intended parent block on the parachain.

14. The method of claim 1, further comprising:
persisting the statement about validity and availability of the candidate block and subjecting the statement about validity and availability of the candidate block to a fault or error detection process such that the relay chain embodies a record of the validity of the candidate block.

15. The method of claim 1, wherein the validator node is one of a subset of a plurality of validator nodes, and further comprising:
randomly shuffling validator nodes in the subset of the plurality of validator nodes.

16. The method of claim 1, wherein the validator node is one of a subset of a plurality of validator nodes, and further comprising:
periodically shuffling validator nodes in the plurality of validator nodes over the plurality of heterogeneous blockchains using a randomness beacon drawn from prior relay-chain blocks.

17. The method of claim 16, wherein the randomness beacon is a non-influenceable piece of randomness.

* * * * *